United States Patent
Yoshida

(10) Patent No.: US 6,897,914 B2
(45) Date of Patent: May 24, 2005

(54) LIQUID CRYSTAL DISPLAY DEVICE INCLUDING TWO LIQUID CRYSTAL DISPLAY UNITS DISPOSED ON OPPOSITE SIDES OF THE DEVICES SO THAT DISPLAY CAN BE OBSERVED FROM THE OPPOSITE SIDES

(75) Inventor: Tetsushi Yoshida, Kanagawa-ken (JP)

(73) Assignee: Casio Computer Co., Ltd., Tokyo (JP)

( * ) Notice: Subject to any disclaimer, the term of this patent is extended or adjusted under 35 U.S.C. 154(b) by 169 days.

(21) Appl. No.: 10/422,463

(22) Filed: Apr. 24, 2003

(65) Prior Publication Data

US 2003/0210360 A1 Nov. 13, 2003

(30) Foreign Application Priority Data

Apr. 26, 2002 (JP) .......................... 2002-127145
Oct. 8, 2002 (JP) .......................... 2002-295039

(51) Int. Cl.[7] ............................. G02F 1/13
(52) U.S. Cl. ............................ 349/65; 349/74
(58) Field of Search ........................ 349/65, 74, 114

(56) References Cited

U.S. PATENT DOCUMENTS 6,480,248 B1 * 11/2002 Lee et al. ............... 349/96
6,741,304 B2 * 5/2004 Nauta et al. ............. 349/65

FOREIGN PATENT DOCUMENTS

| JP | 10-090678 A | 4/1998 |
| JP | 2000-075184 A | 3/2000 |
| JP | 2001-290445 A | 10/2001 |

* cited by examiner

Primary Examiner—James A. Dudek
(74) Attorney, Agent, or Firm—Frishauf, Holtz, Goodman & Chick, P.C.

(57) ABSTRACT

A liquid crystal display device includes first and second display units for controlling transmission and interception of a light incident upon a front side on an observation side of display, whose rear surfaces are disposed to face each other in reverse directions, and an irradiation member. The member including an illumination device for generating a light from opposite surfaces is disposed between two polarized-light split elements between the display units and which reflects a light of a polarized-light components transmitted through one of the polarized-light split elements by the other polarized-light split element and reflects a light of the polarized-light component transmitted through the other polarized-light split element by the one reflective polarized-light split element to irradiate the first and second display units with the light.

20 Claims, 12 Drawing Sheets

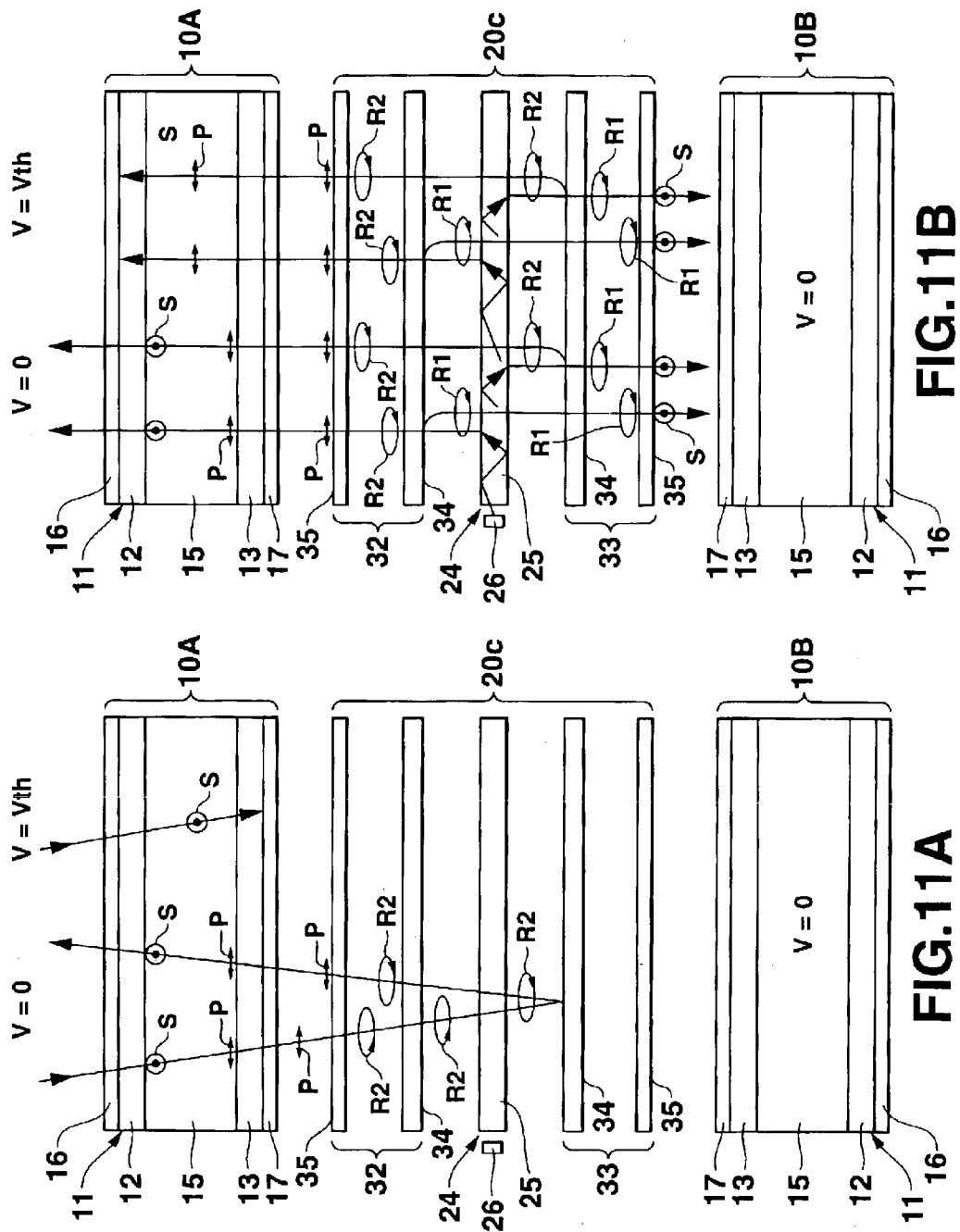

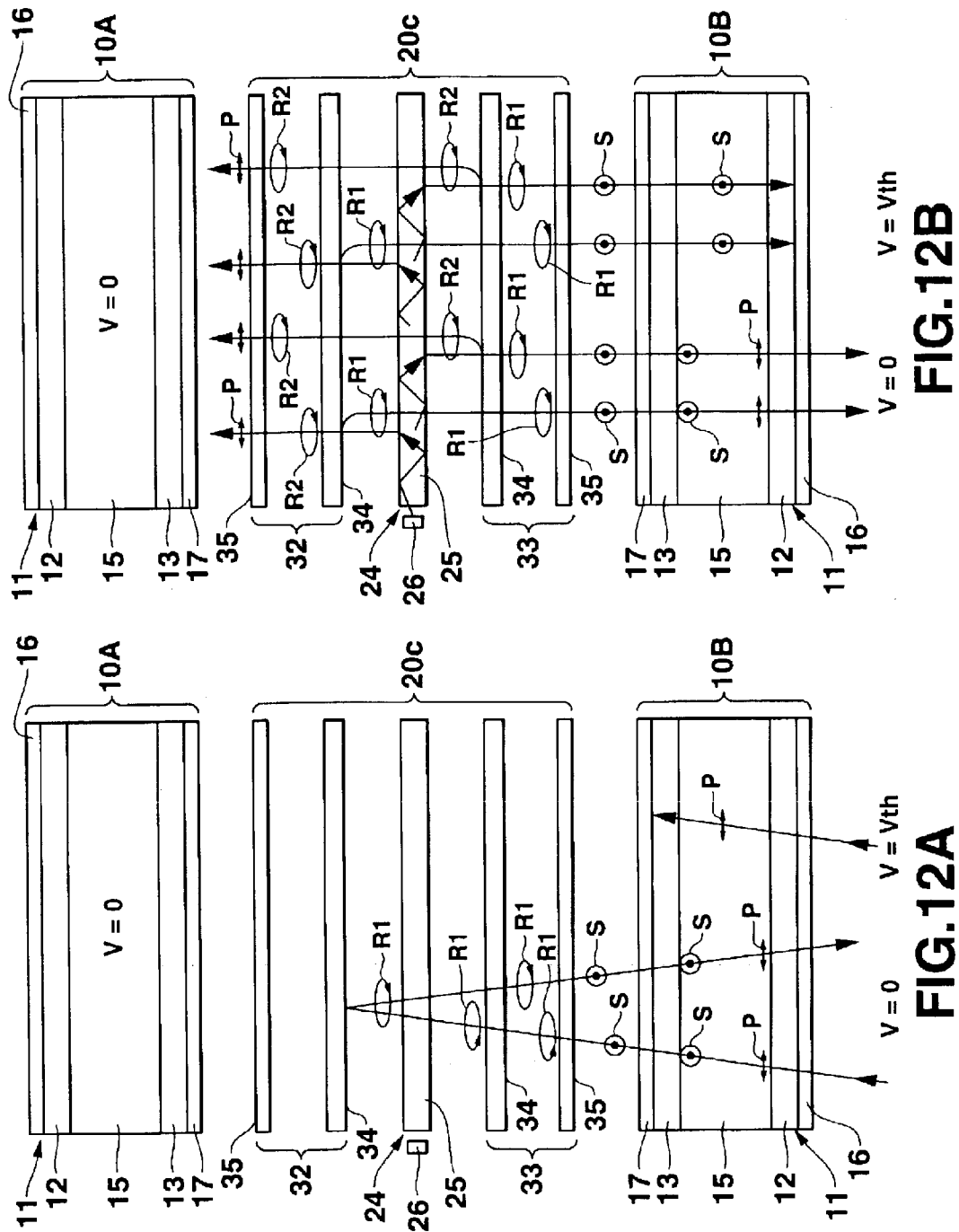

LIQUID CRYSTAL DISPLAY DEVICE INCLUDING TWO LIQUID CRYSTAL DISPLAY UNITS DISPOSED ON OPPOSITE SIDES OF THE DEVICES SO THAT DISPLAY CAN BE OBSERVED FROM THE OPPOSITE SIDES

CROSS-REFERENCE TO RELATED APPLICATIONS

This application is based upon and claims the benefit of priority from the prior Japanese Patent Applications No. 2002-127145, filed Apr. 26, 2002; and No. 2002-295039, filed Oct. 8, 2002, the entire contents of both of which are incorporated herein by reference.

BACKGROUND OF THE INVENTION

1. Field of the Invention

The present invention relates to a display device whose display can be observed from opposite sides of the device.

2. Description of the Related Art

In recent years, as electronic apparatuses such as a cellular phone and portable terminal unit including a lid openable/closable with respect to a device main body, a device has been proposed including display portions disposed on an inner side (surface disposed opposite to the device main body, when a lid is closed) and an outer side of the lid so that information can be displayed in both open and closed states of the lid.

In this type of electronic apparatus, as disclosed in Jpn. Pat. Appln. KOKAI Publication Nos. 10-90678, 2001-290445, a display device of an opposite-side display type is used. In the device, first and second display units for controlling transmission/interception of light are disposed so that rear surfaces on sides opposite to front surfaces on observation sides are disposed opposite to each other in reverse directions, and a plane light source called a backlight is disposed between the rear surfaces of the display units. For this opposite-sides display type display device, the displays of the opposite surfaces are transmission displays in which light from the plane light source is used.

To perform reflection display, a reflective plate is disposed between the two display units, and an outside light which is the light of an outside environment is used in the displays of the opposite sides. For a liquid crystal display unit which performs this known reflection display, as described in Jpn. Pat. Appln. KOKAI Publication No. 2000-75284, there has been proposed a unit using a scattering/polarizing plate which transmits one of two polarized-light components crossing at right angles to each other and which scatters and reflects the other polarized-light component.

However, for the display device constituted to perform the reflection display using the above-described reflective plate and scattering/polarizing plate, the display is dark. Also when the opposite-sides display is performed, there is a problem that the displays of the opposite sides are dark.

BRIEF SUMMARY OF THE INVENTION

An object of the present invention is to provide a display device in which an outside light is used as an illumination light to perform a bright reflective plate display under a bright environment and in which a light source is lit to brightly and clearly perform transmission display by the illumination light under a dark environment.

The object of the present invention is achieved by disposing first and second display units on opposite sides, i.e., front and back sides of a display device. At a time of reflection display in which one surface (front surface of the first display unit) is a display side, light incident on the front side of the first display unit and transmitted through the first display unit is passed through a polarized-light split element on a first display unit side of an irradiation member and reflected by the polarized-light split element on a second display unit side. At the time of the reflection display in which the other back surface (front surface of the second display unit) is the display surface, a light incident on the front side of the second display unit and transmitted through the second display unit is passed through the polarized-light split element on the second display unit side of the irradiation member and reflected by the polarized-light split element on the first display unit side.

That is, according to a first aspect of the present invention, there is provided a display device comprising:

first and second display units whose front surfaces on a side to be observed are outside disposed and whose back surfaces on a side opposite to the side to be observed are inside disposed opposite to each other; and an irradiation member which is disposed between the back surfaces of the first and second display units and which comprises first and second polarized-light split elements to reflect one of two different polarized-light components of an incident light and to transmit the other polarized-light component and which reflects a light of the polarized-light component transmitted through one of the polarized-light split elements by the other polarized-light split element and which reflects the light of the polarized-light component transmitted through the other polarized-light split element by the reflective polarized-light split element to irradiate the first and second display units with the light on back-surface sides.

In the display device according to the first aspect, each of one pair of polarized-light split elements of the irradiation member reflects one of two different polarized-light components of the incident light at a high reflectance substantially without absorbing the component, and transmits the other polarized-light component at a high transmittance substantially without absorbing the component. Even when either one of the opposite surfaces is used as the display side, a sufficiently bright reflection display can be performed.

In this display device, the polarized-light split element comprises a linear polarized-light split element which splits the light into two linear polarized-light components crossing at right angles to each other, transmits one of the linear polarized-light components, and reflects the other linear polarized-light component. Further concretely, each element comprises a reflection polarization plate including: a transmission axis having a direction parallel to a vibration plane of the light of one linear polarized-light component transmitted through the polarized-light split element in two linear polarized-light components of the incident light crossing at right angles to each other; and a reflection axis which crosses at right angles to the transmission axis and which reflects the light of the other linear polarized-light component including the vibration plane in a direction crossing at right angles to the vibration plane of the light of the one linear polarized-light component. The respective transmission axes are preferably disposed to cross at right angles to each other. Alternatively, when the transmission axes of the reflection polarization plates are disposed in parallel with each other, a retardation plate may be disposed between the two reflection polarization plates.

Moreover, in this display device, each display unit preferably comprises: a liquid crystal cell comprising a front-side substrate on an observation side of display, a rear-side substrate on a backside with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having the vibration planes in directions of the incident light crossing at right angles to each other, and absorption axes crossing at right angles to the transmission axes to absorb the linear polarized-light component having the vibration plane in the corresponding direction. In this case, for two reflection polarization elements described above, the transmission axis of the first reflection polarization element on a first liquid crystal display unit side is disposed substantially in parallel with the that of the absorption polarization plate on the rear side of the first liquid crystal display unit. The transmission axis of the second reflection polarization element on a second liquid crystal display unit side is disposed substantially in parallel with that of the absorption polarization plate on the rear side of the second liquid crystal display unit.

Furthermore, in this display device, a lighting device which irradiates both the first display unit side and the second display unit side with the illumination light is preferably disposed between the two polarized-light split elements of the irradiation member. According to this structure, the bright reflection display, and the bright transmission display by the illumination light can be observed from the opposite surfaces of the display device.

In this case, the lighting device comprises: at least one light source; and a plate-shaped light guide plate on whose end surface the light source is disposed and which guides and emits the illumination light incident on the end surface from the light source via the opposite surfaces of a plate-shaped member to irradiate the first and second display units and which transmits the incident lights from the first and second display units.

In this display device, the polarized-light split element comprises a linear polarized-light split element which splits the light into two linear polarized-light components crossing at right angles to each other, transmits one of the linear polarized-light components, and reflects the other linear polarized-light component. The transmission axes of the first and second linear polarized-light split elements are disposed to cross at right angles to each other. Moreover, the transmission axes of the first and second linear polarized-light split elements of the polarized-light split element are disposed in parallel with each other, and a retardation plate for adjusting the polarized state of the transmitted light is disposed between the first and second linear polarized-light split elements. According to a second aspect of the present invention, there is provided a display device comprising:

first and second display units whose front surfaces on a side to be observed are outside disposed and whose back surfaces on a side opposite to the side to be observed are inside disposed opposite to each other; and an irradiation member which comprises first and second polarized-light split elements disposed between the back surfaces of the first and second display units to reflect one of two different polarized-light components of an incident light and to transmit the other polarized-light component, and a lighting device disposed between the first and second polarized-light split elements to transmit the light transmitted through the first and second polarized-light split elements and to emit an illumination light to the first and second polarized-light split elements and which reflects the light of the polarized-light component transmitted through one polarized-light split element by the other polarized-light split element and reflects the light of the polarized-light component transmitted through the other polarized-light split element by the one reflective polarized-light split element to allow the light from the lighting device to be incident upon the first and second display units on back-surface sides.

In the display device of the second aspect, according to the structure, bright reflection display, and bright transmission display by the illumination light can be observed from the opposite surfaces of the display device.

Moreover, in this display device, each of the first and second display units comprises: a liquid crystal cell comprising a front-side substrate on an observation side of display, a rear-side substrate on a backside with respect to the front-side substrate, and a liquid crystal layer which is disposed between the front-side substrate and rear-side substrate to control the polarized state of the transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having the vibration planes in directions of the incident light crossing at right angles to each other, and absorption axes crossing at right angles to the transmission axes to absorb the linear polarized-light component having the vibration plane in the corresponding direction. For two reflection polarization elements described above, the transmission axis of the first reflection polarization element on the first liquid crystal display unit side is disposed substantially in parallel with that of the absorption polarization plate on the rear side of the first liquid crystal display unit. The transmission axis of the second reflection polarization element on the second liquid crystal display unit side is disposed substantially in parallel with that of the absorption polarization plate on the rear side of the second liquid crystal display unit.

Furthermore, in the display device of the present invention, the polarized-light split element of the irradiation member may be a circular polarized-light split element which splits the light into two circular polarized-light components rotating in directions different from each other, transmits the circular polarized-light component turning in one direction, and reflects the circular polarized-light component turning in the other direction. In this case, each polarized-light split element comprises: a circular polarized-light split layer which reflects one of two clockwise and counterclockwise circular polarized-light components of the incident light and which transmits the other circular polarized-light component; and $\lambda/4$ retardation plates disposed on the opposite sides of the circular polarized-light split layer. Moreover, the irradiation member preferably further comprises a lighting device which is disposed between the two circular polarized-light split elements and which irradiates both the sides of the first and second display units with the illumination light.

Moreover, each of the first and second display units comprises: a liquid crystal cell comprising a front-side substrate on an observation side of display, a rear-side substrate on a backside with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having vibration planes in directions of the incident light crossing at right angles to each other, and absorption axes crossing at right angles to the transmission axes to absorb the linear polarized-light component having the vibration plane in the corresponding direction. A delay phase axis of the λ/4 retardation plate of the polarized-light split element intersects with the absorption axis of the absorption polarization plate of the liquid crystal display unit at 45°.

According to a third aspect of the present invention, there is provided a display device comprising: first and second display means for displaying images, whose front surfaces on a side to be observed are outside disposed and whose back surfaces on a side opposite to the side to be observed are inside disposed opposite to each other; and irradiation means which comprises first and second polarized-light split means, disposed between the back surfaces of the first and second display means, for splitting an incident light into two different polarized-light components, reflecting one of the polarized-light components, and transmitting the other polarized-light component, and lighting means, disposed between the two polarized-light split means, for irradiating both the sides of the first and second display means with an illumination light and which reflects the light of the other polarized-light component transmitted through one of the polarized-light split means by the other polarized-light split means, reflects the light of the other polarized-light component transmitted through the other polarized-light split means by the one reflective polarized-light split means, and allows the light to be incident upon the first and second display means on back-surface sides from the lighting means.

In the display device of the third aspect, the bright reflection display, and the bright transmission display by the illumination light can be observed from the opposite surfaces of the display device.

In this display device, the polarized-light split means comprises means whose polarization surface splits the light into two linear polarized lights crossing at right angles to each other. Moreover, the irradiation means preferably comprises: first and second polarized-light split means for reflecting one of two different polarized-light components of an incident light and transmitting the other polarized-light component; and light guide means, disposed between the first and second polarized-light split means, for transmitting the light transmitted through the first and second polarized-light split means and for emitting the illumination light to the first and second polarized-light split means. Furthermore, each of the first and second display means comprises: a liquid crystal cell comprising a front-side substrate on an observation side of display, a rear-side substrate on a backside with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having vibration planes in directions of the incident light crossing at right angles to each other, and absorption axes crossing at right angles to the transmission axes to absorb the linear polarized-light component having the vibration plane in the corresponding direction. For two reflection polarization means, the transmission axis of the first reflection polarization means on the first liquid crystal display unit side is disposed substantially in parallel with that of the absorption polarization plate on the rear side of the first liquid crystal display means. The transmission axis of the second reflection polarization means on the second liquid crystal display means side is disposed substantially in parallel with that of the absorption polarization plate on the rear side of the second liquid crystal display means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A, 4B are perspective views showing one example of an electronic apparatus including display portions on opposite sides, in which FIG. 4A shows a closed state, and FIG. 4B shows an opened state;

FIGS. 11A, 11B are diagrams schematically showing the transmission paths of the incident light at the time when one surface of the display device of the fourth embodiment is the display side; and FIGS. 12A, 12B are diagrams schematically showing the transmission paths of the incident light at the time when the other surface of the display device of the fourth embodiment is the display side.

DETAILED DESCRIPTION OF THE INVENTION

Liquid crystal display devices will be described below as embodiments of the present invention with reference to the accompanying drawings.

[First Embodiment]

Figure 1:
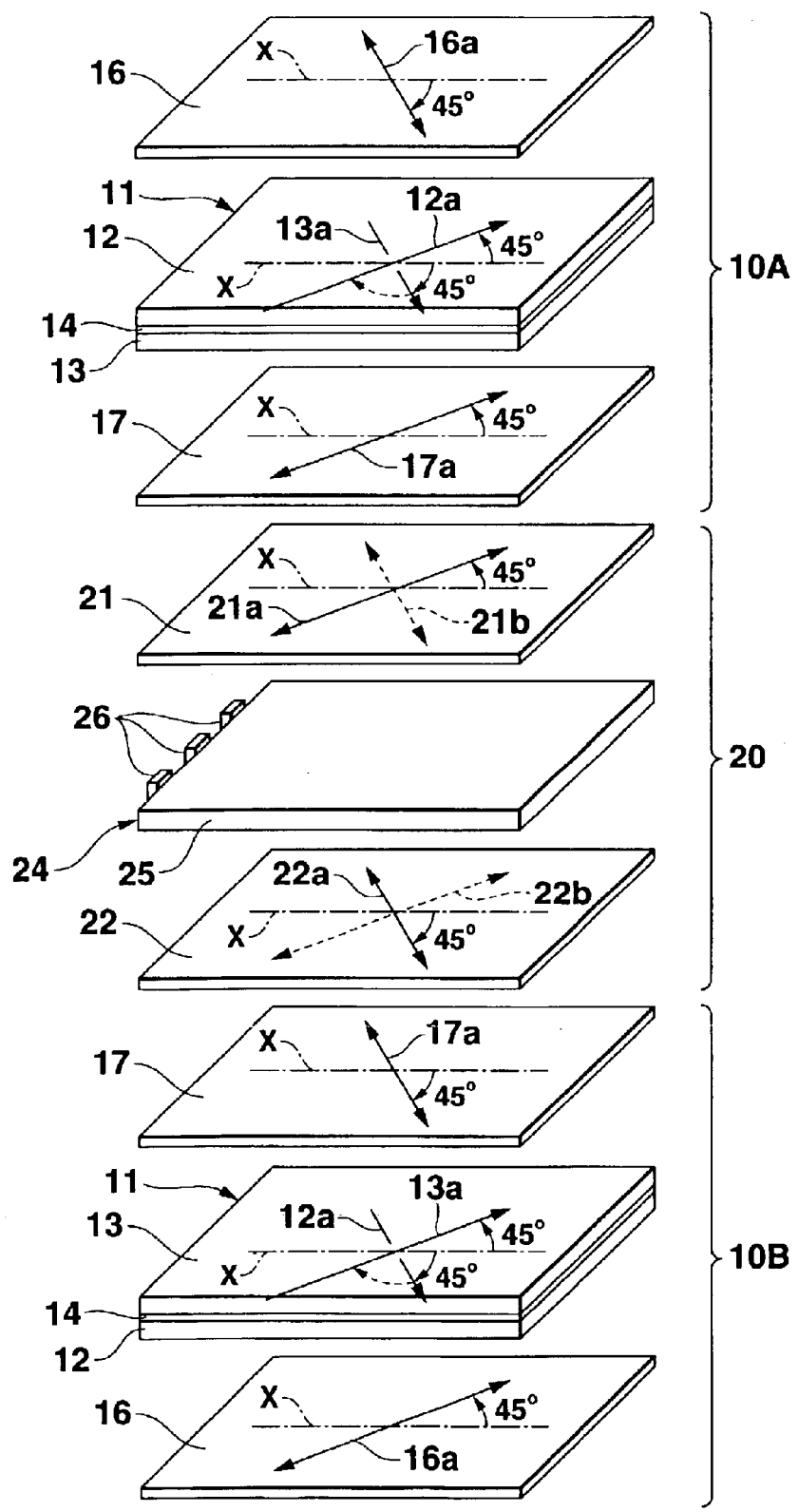
FIG. 1 is an exploded perspective view of a display device according to a first embodiment of the present invention.
Figure 2B:
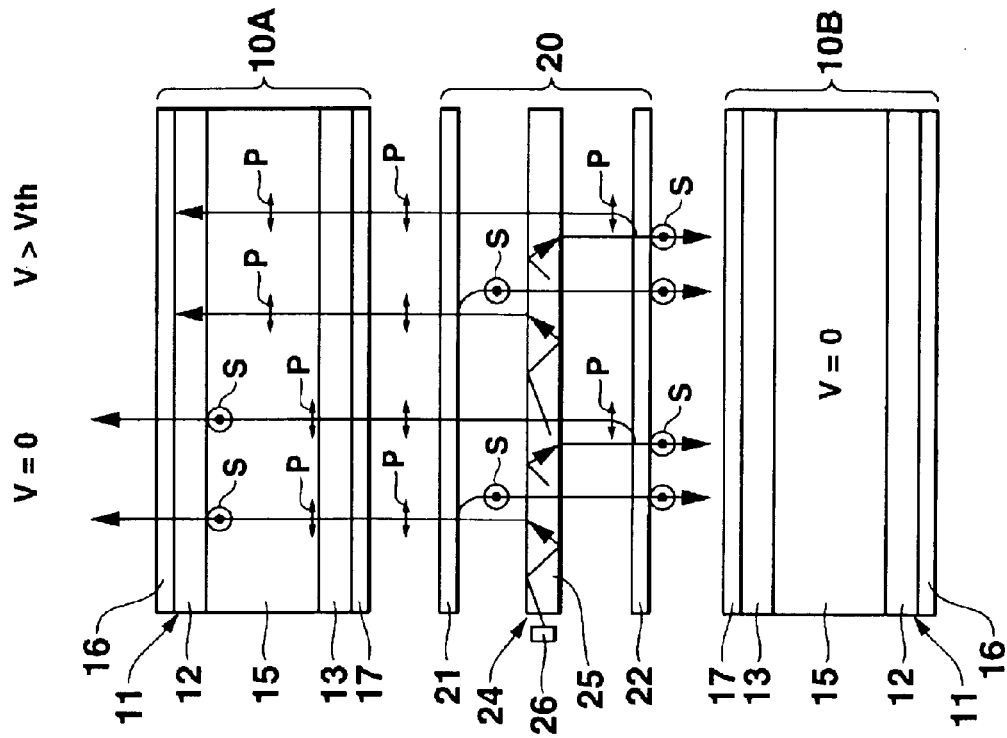
FIGS. 2A, 2B are diagrams schematically showing transmission paths of an incident light at a time when one surface of the display device of the first embodiment is a display side.
Figure 2A:
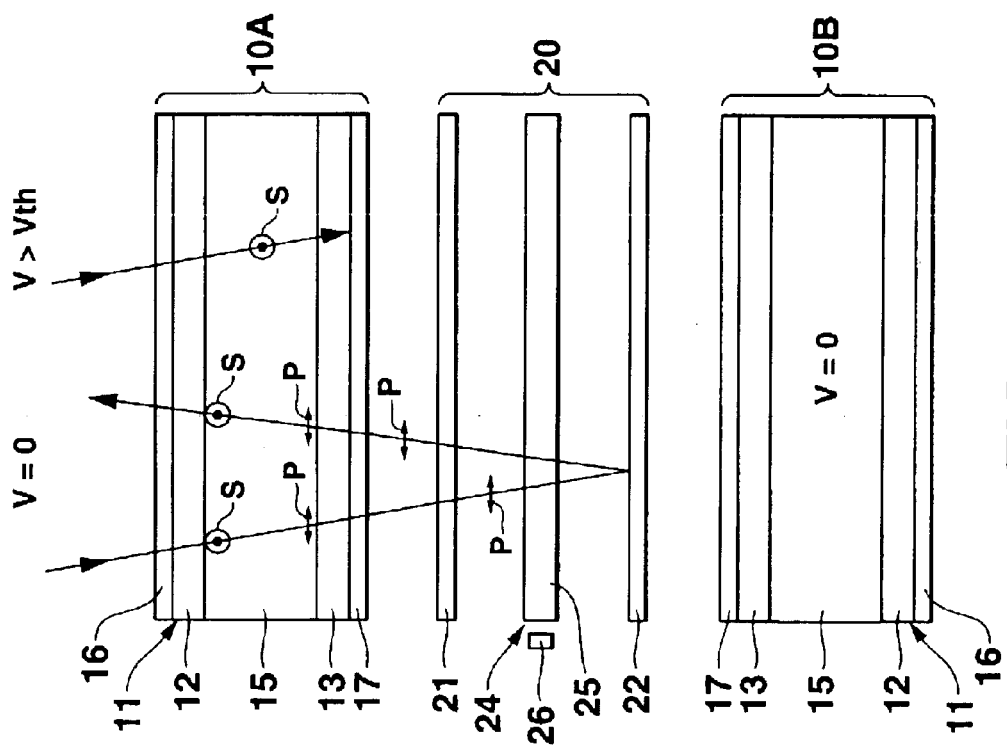
Figures 3A, 3B:
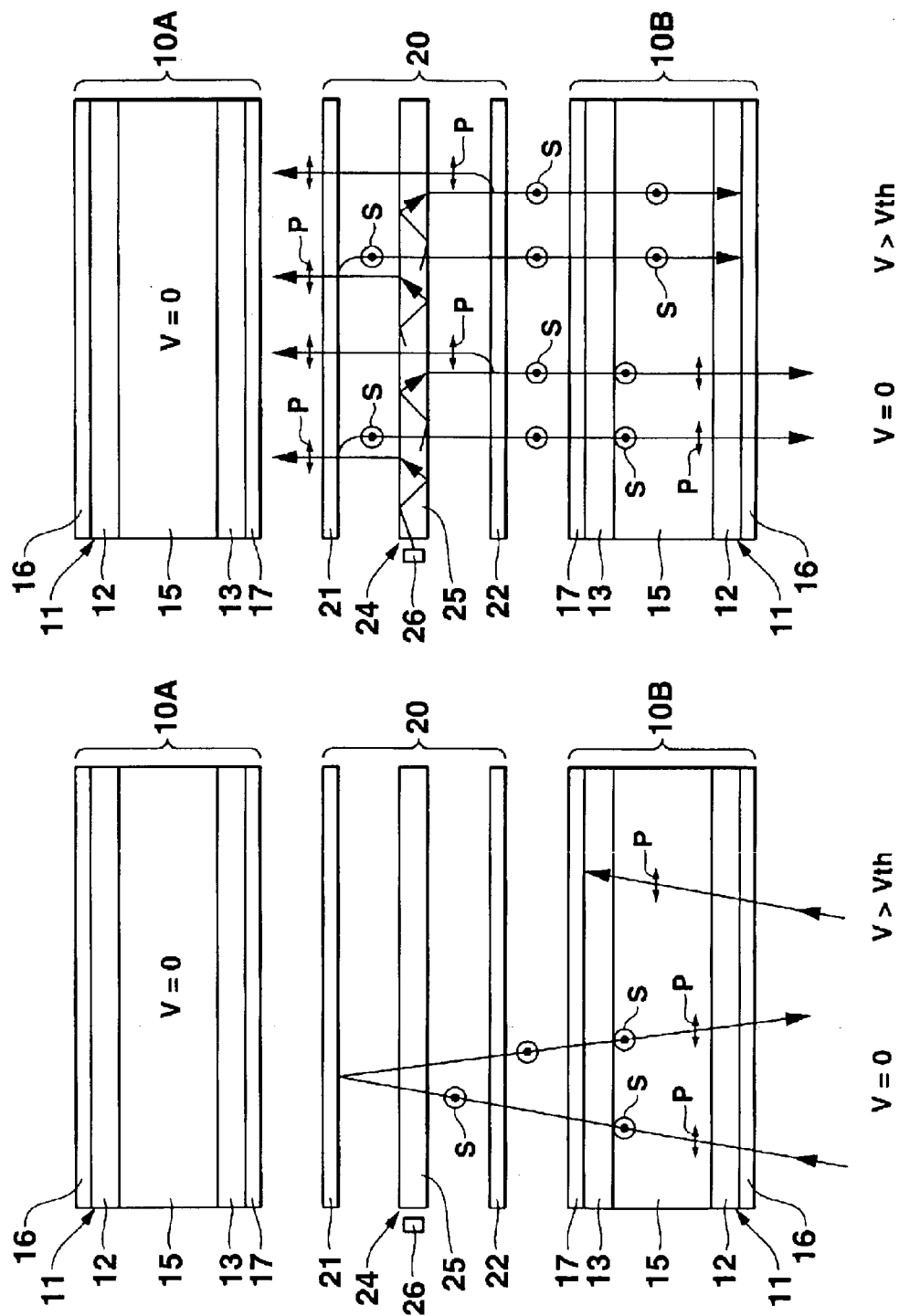
FIGS. 3A, 3B are diagrams schematically showing the transmission paths of the incident light at a time when the other surface of the display device of the first embodiment is the display side.
Figure 4A:
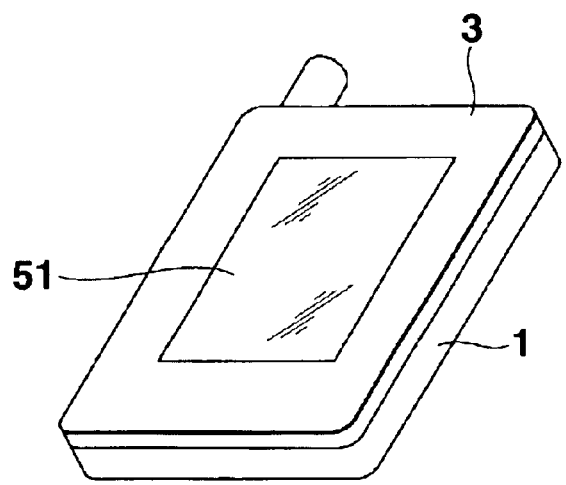
Figure 4B:
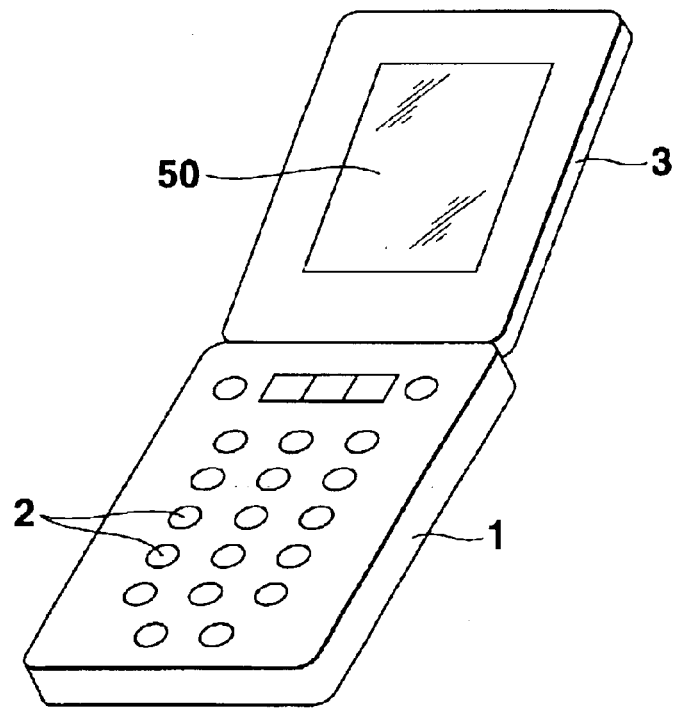

FIGS. 1 to 4A and 4B show a first embodiment of the present invention, wherein FIG. 1 is an exploded perspective view of a display device, FIGS. 2A, 2B and 3A, 3B are schematic diagrams showing transmission paths of an incident light at a time when one surface of the display device is a display side, and the other surface is the display side, and FIGS. 4A, 4B are perspective views showing one example of an electronic apparatus including display portions on opposite sides.

First, the electronic apparatus shown in FIGS. 4A, 4B will be described. The electronic apparatus is a cellular phone, and includes: an apparatus main body 1 including a plurality of keys 2 in a front surface; and a lid 3 whose one end is rotatably supported by an upper edge of the apparatus main body 1 to be openable/closable/rotatable with respect to the apparatus main body 1. Display portions 50, 51 are respectively disposed in an inner surface of the lid 3, that is, a surface disposed to face the apparatus main body 1 when the lid 3 is closed as shown in FIG. 4A and faced forwards when the lid 3 is opened as shown in FIG. 4B, and an outer surface of the lid 3.

As shown in FIG. 1, the display device of the first embodiment includes: first and second display units 10A, 10B whose rear surfaces opposite to an observation side of display are disposed to face with each other in reverse directions and which control transmission and interception of light incident upon a front side as the observation side of the display; and an illumination member 20 disposed between the first and second display units 10A, 10B.

The display units 10A, 10B are, for example, liquid crystal display units, and each unit includes a liquid crystal cell 11, and a pair of polarization plates 16, 17 disposed before and after the liquid crystal cell 11. Each liquid crystal cell 11 is constituted by bonding a transparent substrate 12, on a front side, which is the observation side of the display, to a transparent substrate 13 on a rear side, disposed opposite the front-side substrate 12, via a frame-shaped seal member 14. In the region enclosed by the seal member 14, a liquid crystal layer 15 (see FIG. 2A) is disposed/constituted, for polarization control of the transmitted light, in accordance with an applied electric field.

Although omitted from the drawing, in the inner surfaces of the substrates 12, 13 before and after the liquid crystal cell 11 which face the liquid crystal layer 15, as already known, transparent electrodes are disposed to form a plurality of pixels arranged in a matrix form by regions disposed opposite by face with each other, and an alignment film is disposed on the electrodes.

The liquid crystal cell 11 is an active matrix liquid crystal cell in which, for example, a thin-film transistor (TFT) is an active element. In one substrate of the cell, for example, the inner surface of the rear-side substrate 13, a plurality of pixel electrodes are arranged in a matrix form in row and column directions, a plurality of TFTs are connected to these pixel electrodes, a plurality of gate wirings for supplying gate signals to the TFTs of each row are disposed, and a plurality of data wirings for supplying data signals to the TFTs of each column are disposed. In the inner surface of the front-side substrate 12 which is the other substrate, there are disposed color filters of three colors, for example, red, green, and blue, which are alternatively disposed/formed opposite to the plurality of pixel electrodes, and an opposite electrode which is disposed face the plurality of pixel electrodes in the form of one film.

Each of the liquid crystal display units 10A, 10B is of a twisted nematic (TN) type. The liquid crystal layer 15 of the liquid crystal cell 11 is formed of a nematic liquid crystal in which liquid crystal molecules are twisted/aligned at a twist angle substantially of 90° between the front and rear substrates 12, 13 and whose dielectric anisotropy is positive.

In FIG. 1, an arrow 12a shows a liquid crystal molecule alignment direction in the vicinity of the front-side substrate 12 of the liquid crystal cell 11, and an arrow 13a shows the liquid crystal molecule alignment direction in the vicinity of the rear-side substrate 13. In the drawing, the liquid crystal molecule alignment direction 12a in the vicinity of the front-side substrate (upper substrate in the drawing) 12 of the upper first liquid crystal display unit 10A in the drawing is in a constant direction, for example, in a direction turned clockwise substantially by 45° as seen from the front side with respect to the abscissa (horizontal axis of a screen) x of the first and second liquid crystal display units 10A, 10B disposed in parallel with each other. The liquid crystal molecule alignment direction 13a in the vicinity of the rear-side substrate (lower substrate in the drawing) 13 is in the other direction with respect to the abscissa x, that is, in a direction turned counterclockwise substantially by 45° as seen from the front side. The liquid crystal the molecule of the liquid crystal layer 15 of the first liquid crystal display unit 10A are twist-aligned in a twist direction clockwise toward the front-side substrate 12 from the rear-side substrate 13 substantially by 90° as seen from the front side as shown by a broken-line arrow in FIG. 1.

The liquid crystal molecule alignment direction 12a in the vicinity of the front-side substrate (lower substrate in the drawing) 12 of the lower second liquid crystal display unit 10B in FIG. 1 is a direction substantially crossing at right angles to the liquid crystal molecule alignment direction 12a in the vicinity of the front-side substrate 12 of the first liquid crystal display unit 10A (in a clockwise direction substantially by 45° as seen from the front side with respect to the abscissa x). The liquid crystal molecule alignment direction 13a in the vicinity of the rear-side substrate (upper substrate in the drawing) 13 is a direction substantially crossing at right angles to the liquid crystal molecule alignment direction 13a in the vicinity of the rear-side substrate 13 of the first liquid crystal display unit 10A (in a counterclockwise direction substantially of 45° as seen from the front side with respect to the abscissa x). The liquid crystal molecules of the liquid crystal layer 15 of the second liquid crystal display unit 10B are twist-aligned in the twist direction substantially of 90° toward the front-side substrate 12 from the rear-side substrate 13 counterclockwise as seen from the front side (clockwise as seen from the rear side in FIG. 1) as shown by the broken-line arrow in FIG. 1.

Conversely, for the liquid crystal molecule alignment directions 12a, 13a in the vicinity of the front-side substrate 12 and rear-side substrate 13 of the first and second liquid crystal display units 10A, 10B, the liquid crystal molecule alignment directions 12a in the vicinity of the front-side substrates 12 of the liquid crystal display units 10A, 10B are substantially parallel to each other. The liquid crystal molecule alignment directions 13a in the vicinity of the rear-side substrates 13 of the liquid crystal display units 10A, 10B are substantially parallel to each other.

A pair of polarization plates 16, 17 disposed via the liquid crystal cell 11 in each of the first and second liquid crystal display units 10A, 10B have transmission axes 16a, 17a and absorption axes (not shown) in directions crossing at right angles to each other. The absorption polarization plates absorb one linear polarized-light component having a vibration plane parallel to the absorption axis in two linear polarized-light components of the incident light crossing at right angles to each other. The other linear polarized-light component having the vibration plane parallel to the transmission axes 16a, 17a is transmitted. The front-side absorption polarization plate 16 is attached to the outer surface of the front-side substrate 12 of the liquid crystal cell 11, while the transmission axis 16a substantially crosses at right angles to or extends in parallel with (crosses at right angles in the drawing) the liquid crystal molecule alignment direction 12a in the vicinity of the front-side substrate 12 of the liquid crystal cell 11. The rear-side absorption polarization plate 17 is attached to the outer surface of the rear-side substrate 13 of the liquid crystal cell 11, while the transmission axis 17a substantially crosses at right angles to the transmission axis 16a of the front-side absorption polarization plate 16.

That is, the front-side absorption polarization plates 16 of the first and second liquid crystal display units 10A, 10B are disposed so that the transmission axes 16a substantially cross at right angles to each other. The rear-side absorption polarization plates 17 on opposite surface sides of the first and second liquid crystal display units 10A, 10B are so disposed that the transmission axes 17a substantially cross at right angles to each other.

The illumination or irradiation member 20 disposed between the first and second liquid crystal display units 10A, 10B includes a pair of polarized-light split elements 21, 22. Further in the constitution, a plane light source 24 is disposed between these polarized-light split elements 21, 22.

The pair of polarized-light split elements 21, 22 are, for example, reflection polarization elements which reflect one of two linear polarized-light components of the incident light crossing at right angles to each other and transmit the other linear polarized-light component. Each of the reflection polarization elements includes a transmission axis having a direction parallel to the vibration plane of the light of one linear polarized-light component transmitted through the polarized-light split element in two linear polarized-light components of the incident light crossing at right angles to each other. The element also includes a reflection axis which crosses at right angles to the transmission axis and which reflects the light of the other linear polarized-light component having the vibration plane in a direction crossing at right angles to the vibration plane of the light of one linear polarized-light component. That is, the reflection polarization elements have transmission axes 21a, 22a and reflection axes 21b, 22b in the directions crossing at right angles to each other. The elements reflect the linear polarized-light component having the vibration plane parallel to the reflection axes 21b, 22b, and transmit the light of the linear polarized-light component having the vibration plane parallel to the transmission axes 21a, 22a. The polarized-light split elements 21, 22 will be hereinafter referred to as the reflection polarization elements.

In the pair of reflection polarization elements 21, 22, the transmission axes 21a, 22a substantially cross at right angles to each other. The transmission axis 21a of the reflection polarization element (hereinafter referred to as the first reflection polarization element) 21 on a first liquid crystal display unit 10A side is disposed substantially in parallel with the transmission axis 17a of the absorption polarization plate 17 on the rear side of the first liquid crystal display unit 10A. The transmission axis 22a of the reflection polarization element (hereinafter referred to as the second reflection polarization element) 22 on a second liquid crystal display unit 10B side is disposed substantially in parallel with the transmission axis 17a of the absorption polarization plate 17 on the rear side of the second liquid crystal display unit 10B.

The plane light source 24 disposed between the first and second reflection polarization elements 21, 22 includes: a plate-like light guide plate 25 which transmits light incident upon opposite plate surfaces and emits the incident light from an end surface, from at least one of the opposite surfaces; and a plurality of light emitting elements 26 disposed to face the end surface of the light guide plate 25.

In the plane light source 24 for use in this embodiment, the light emitting elements 26 formed of light emitting diodes (LED) are disposed to face the end surface of the light guide plate 25. The light emitting element disposed to face the end surface of the light guide plate 25 may also be a cold cathode tube in the form of a straight tube.

The plane light source 24 transmits the light incident upon one surface of the light guide plate 25 to emit the light from the other surface of the light guide plate 25, and transmits the light incident upon the other surface of the light guide plate 25 to emit the light from one surface of the light guide plate 25. The source totally reflects the lights emitted from the light emitting elements 26 and incident upon the end surface of the light guide plate 25 by an interface between the opposite surfaces of the light guide plate 25, guides the lights in the light guide plate 25, and emits the lights from the opposite plate surfaces. The light emitting elements 26 are turned off at a use time of the display device under an environment under which a sufficiently bright outside light is obtained. The elements are lit at the use time of the display device under the environment under which the sufficiently bright outside light is not obtained.

Although omitted from the drawing, in either one of the opposite surfaces of the light guide plate 25, a plurality of trench-like concave portions for reflecting the light coming toward the surface in the light guide plate 25 in a direction in which an angle decreases with respect to a normal of the light guide plate surface are formed in parallel with the light guide plate end surface. Therefore, the light guided in the light guide plate 25 is emitted mainly from the surface disposed to face the surface of the light guide plate 25 in which the trench-like concave portions are formed.

The plane light source 24 is disposed so that one surface of the light guide plate 25 is disposed to face the first reflection polarization element 21 and the other surface of the light guide plate 25 is disposed to face the second reflection polarization element 22. Air layers are disposed between the opposite surfaces of the light guide plate 25 and the first and second reflection polarization elements 21, 22.

For the display device, in the lid 3 of the electronic apparatus (cellular phone), for example, shown in FIGS. 4A, 4B, the display portion 50 of the inner surface of the lid 3 is disposed on one surface side of the liquid crystal display device, for example, on the front-surface side (upper side in FIG. 1) of the first liquid crystal display unit 10A. On the other surface side, that is, on the front-surface side (lower side in FIG. 1) of the second liquid crystal display unit 10B, the display portion 51 of the outer surface of the lid 3 is disposed.

This display device performs reflection display using the front surface of the first liquid crystal display unit 10A as one display surface, and reflection display using the front surface of the second liquid crystal display unit 10B as the other display surface. When one surface is the display side, the first liquid crystal display unit 10A is driven to control the transmission and interception of the incident light. The second liquid crystal display unit 10B is driven to control the transmission and interception of the incident light, when the other surface is used as the display side.

This display device performs the reflection display using the outside light incident upon the front side, which is the observation side of the display under the environment under which the sufficiently bright outside light is obtained, both when one surface is used as the display side and when the other surface is the display side. When the sufficiently bright outside light cannot be obtained, the illumination light is emitted from the plane light source 24 of the irradiation member 20, and used to perform transmission display. Either display is observed from a front-side direction (direction in the vicinity of the normal of the screen).

For the display device of this embodiment, as shown in FIG. 1, in the first and second liquid crystal display units 10A, 10B, the transmission axis 16a of the absorption polarization plate 16 on the front side substantially crosses at right angles to the transmission axis 17a of the absorption polarization plate 17 on the rear side. Therefore, for the reflection display and transmission display in which one surface is the display side, and the reflection display and transmission display in which the other surface is the display side, the display at a non electric field time when the electric field is not applied to the liquid crystal layer 15 of the liquid crystal cell 11 (aligned state of the liquid crystal molecules of the liquid crystal layer 15 is an initial twist alignment) is the bright display. This is a so called display of a normally white mode.

First, a transmission path of the incident light at a time when one surface is the display side will be described. At the time of the reflection display using one surface as the display side, as shown in FIG. 2A, in two linear polarized-light components of the outside light (non-polarized light) incident upon the front side of the first liquid crystal display unit 10A, which cross at right angles to each other, the linear polarized-light component having the vibration plane parallel to the absorption axis of the front-side absorption polarization plate 16 of the first liquid crystal display unit 10A is absorbed by the absorption polarization plate 16. The linear polarized-light component having the vibration plane parallel to the transmission axis 16a of the absorption polarization plate 16 is transmitted through the absorption polarization plate 16 to form a linearly polarized light S parallel to the transmission axis 16a of the absorption polarization plate 16. The light is incident upon the liquid crystal cell 11 of the first liquid crystal display unit 10A on the front side.

The linearly polarized light S incident upon the liquid crystal cell 11 on the front side undergoes a birefringence function of the liquid crystal layer 15 in accordance with the aligned state of the liquid crystal molecule, which changes by the electric field applied between the electrodes of the liquid crystal cell 11, and is emitted on the rear side of the liquid crystal cell 11. The light is intercepted by the rear-side absorption polarization plate 17 or transmitted through the rear-side absorption polarization plate 17, and emitted on the rear side of the first liquid crystal display unit 10A.

That is, the aligned state of the liquid crystal molecule at the non-electric-field time (V=0) when the electric field is not applied between the electrodes of the liquid crystal cell 11 is twist alignment at a twist angle substantially of 90°. At this time, as shown on the left side of FIG. 2A, the linearly polarized light S incident upon the liquid crystal cell 11 through the front-side absorption polarization plate 16 turns substantially by 90° by the birefringence function of the liquid crystal layer 15 to form a linearly polarized light P parallel to the transmission axis 17a of the rear-side absorption polarization plate 17, and is emitted on the rear side of the liquid crystal cell 11. Therefore, at the non-electric-field time, the linearly polarized light P emitted on the rear side of the liquid crystal cell 11 is transmitted through the rear-side absorption polarization plate 17 and emitted on the rear side of the first liquid crystal display unit 10A.

The linearly polarized light P emitted on the rear side of the first liquid crystal display unit 10A is incident upon the irradiation member 20.

Moreover, the transmission axis 21a of the first reflection polarization element 21 on the first liquid crystal display unit 10A side of the irradiation member 20 is substantially parallel to the transmission axis 17a of the absorption polarization plate 17 on the rear side of the first liquid crystal display unit 10A. Therefore, most of the linearly polarized light P emitted on the rear side of the first liquid crystal display unit 10A and incident upon the irradiation member 20 is transmitted through the first reflection polarization element 21.

The linearly polarized light P transmitted through the first reflection polarization element 21 is transmitted through the light guide plate 25 of the plane light source 24, incident upon the second reflection polarization element 22 of the irradiation member 20 and reflected by the second reflection polarization element 22.

That is, since the transmission axes 21a, 22a of the first reflection polarization element 21 and second reflection polarization element 22 substantially cross at right angles to each other, the linearly polarized light P transmitted through the first reflection polarization element 21 and incident upon the second reflection polarization element 22 is the light of the linear polarized-light component having the vibration plane parallel to the reflection axis 22b of the second reflection polarization element 22. Therefore, most of the light is reflected by the second reflection polarization element 22.

The linearly polarized light P reflected by the second reflection polarization element 22 is transmitted through the light guide plate 25 of the plane light source 24 again, and further transmitted through the first reflection polarization element 21. The light is emitted from the surface disposed to face the first liquid crystal display unit 10A of the irradiation member 20, and is incident upon the first liquid crystal display unit 10A on the rear side.

The linearly polarized light P incident upon the first liquid crystal display unit 10A on the rear side is transmitted through the absorption polarization plate 17 on the rear side of the first liquid crystal display unit 10A. The light is turned substantially by 90° by the liquid crystal layer 15 of the liquid crystal cell 11 to form the linearly polarized light S parallel to the transmission axis 16a of the absorption polarization plate 16 on the front side. The light is transmitted through the front-side absorption polarization plate 16 and emitted on the front side of the first liquid crystal display unit 10A.

On the other hand, the electric field is applied between the electrodes of the liquid crystal cell 11 of the first liquid crystal display unit 10A so as to raise and align the liquid crystal molecules substantially vertically to the substrates 12, 13 planes. At this electric field application time (V>Vth), as shown on the right side of FIG. 2A, the linearly polarized light S incident upon the first liquid crystal display unit 10A on the front side, transmitted through the absorption polarization plate 16 on the front side, and incident upon the liquid crystal cell 11 is transmitted through the liquid crystal cell 11 still in the polarized state without undergoing any birefringence function of the liquid crystal layer 15. The light is incident upon the absorption polarization plate 17 on the rear side, and absorbed by the absorption polarization plate 17.

Therefore, the display at the non-electric-field time in the reflection display using the one surface (front surface of the first liquid crystal display unit 10A) as the display side is bright display (white display), and the display at the electric field application time (V>Vth) is dark display (black display).

At the time of the transmission display using the one surface as the display side, the light emitting elements 26 of the plane light source 24 of the illumination member 20 are lit. As shown in FIG. 2B, the outgoing light from the light emitting element 26 is incident upon the end surface of the light guide plate 25, totally reflected by the opposite surfaces of the light guide plate 25 and the interface between the plate and outside air layer, guided in the light guide plate 25, and emitted from the opposite surfaces of the light guide plate 25.

The illumination light emitted from the surface facing the first reflection polarization element 21 of the light guide plate 25 is incident upon the first reflection polarization element 21. For the light (non-polarized light), the linearly polarized light S parallel to the reflection axis 21b of the first reflection polarization element 21 is reflected by the first reflection polarization element 21. The linearly polarized light P parallel to the transmission axis 21a of the first reflection polarization element 21 is transmitted through the first reflection polarization element 21 and emitted on the first liquid crystal display unit 10A side.

The illumination light emitted from the surface facing the second reflection polarization element 22 of the light guide plate 25 is incident upon the second reflection polarization element 22 while the transmission axis 22a is disposed to substantially cross at right angles to the transmission axis 21a of the first reflection polarization element 21. For the light (non-polarized light), the linearly polarized light S parallel to the transmission axis 22a of the second reflection polarization element 22 is transmitted through the second reflection polarization element 22 and emitted on the second liquid crystal display unit 10B side. The linearly polarized light P parallel to the transmission axis 22b of the second reflection polarization element 22 is reflected by the second reflection polarization element 22.

The linearly polarized light P reflected by the second reflection polarization element 22 is transmitted through the light guide plate 25, further transmitted through the first reflection polarization element 21, and emitted on the first liquid crystal display unit 10A side.

For the illumination light emitted from the surface disposed opposite to the first reflection polarization element 21 of the light guide plate 25, the linearly polarized light S reflected by the first reflection polarization element 21 is transmitted through the light guide plate 25 and further through the second reflection polarization element 22, and is finally emitted on the second liquid crystal display unit 10B side.

In this manner, for the illumination light from the plane light source 24, the irradiation member 20 emits the linearly polarized light P emitted from the surface facing the first reflection polarization element 21 of the light guide plate 25 and transmitted through the first reflection polarization element 21, and the linearly polarized light P emitted from the surface facing to the second reflection polarization element 22 of the light guide plate 25, reflected by the second reflection polarization element 22, and transmitted through the first reflection polarization element 21 on the first liquid crystal display unit 10A side. Moreover, the member emits the linearly polarized light S emitted from the surface facing the second reflection polarization element 22 of the light guide plate 25 and transmitted through the second reflection polarization element 22, and the linearly polarized light S emitted from the surface facing the first reflection polarization element 21 of the light guide plate 25, reflected by the first reflection polarization element 21, and transmitted through the second reflection polarization element 22 on the second liquid crystal display unit 10B side.

That is, the irradiation member 20 emits about 50% of the illumination light from the plane light source 24 as the linearly polarized light P on the first liquid crystal display unit 10A side, and another about 50% as the linearly polarized light S on the second liquid crystal display unit 10B side.

Therefore, the linearly polarized light P emitted on the first liquid crystal display unit 10A side from the irradiation member 20 has substantially the same strength as that of the linearly polarized light S emitted on the second liquid crystal display unit 10B side.

As described above, the light guide plate 25 emits the light guided in the light guide plate 25 mainly from the surface on the side facing the surface in which the trench-like concave portions (not shown) are formed. About 50% of the light emitted from the surface facing the first reflection polarization element 21 of the light guide plate 25, and about 50% of the light emitted from the surface facing to the second reflection polarization element 22 are emitted as the linearly polarized light P on the first liquid crystal display unit 10A side. The light of the other about 50% is emitted as the linearly polarized light S on the second liquid crystal display unit 10B side. Therefore, for the light guide plate 25, the surface in which the trench-like concave portions are formed is disposed to face either one of the first and second reflection polarization elements 21, 22. Even in this case, the linearly polarized light P and linearly polarized light S having substantially the same strength can be emitted on the first liquid crystal display unit 10A side and on the second liquid crystal display unit 10B side.

The linearly polarized light P emitted on the first liquid crystal display unit 10A side from the irradiation member 20 is transmitted through the absorption polarization plate 17 of the first liquid crystal display unit 10A, and is incident upon the liquid crystal cell 11 from the rear side. The light undergoes birefringence by the liquid crystal layer 15 in accordance with the aligned state of the liquid crystal molecules, which changes by the electric field applied between the electrodes of the liquid crystal cell 11, and is emitted on the front side of the liquid crystal cell 11.

That is, at the non-electric-field time (V=0) when the electric field is not applied between the electrodes of the liquid crystal cell 11, as shown on the left side of FIG. 2B, the linearly polarized light P incident upon the liquid crystal cell 11 from the rear side is turned substantially by 90° by the birefringence of the liquid crystal layer 15. The linearly polarized light S parallel to the transmission axis 16a of the front-side absorption polarization plate 16 is formed, emitted on the front side of the liquid crystal cell 11, transmitted through the front-side absorption polarization plate 16, and emitted on the front side of the first liquid crystal display unit 10A.

On the other hand, at the electric field application time (V>Vth) when the electric field is applied between the electrodes of the liquid crystal cell 11 of the first liquid crystal display unit 10A so as to raise and align the liquid crystal molecules substantially vertically to the substrates 12, 13 planes, as shown on the right side of FIG. 2B, the linearly polarized light P incident upon the liquid crystal cell 11 from the rear side is transmitted through the liquid crystal cell 11 still in the polarized state without undergoing any birefringence of the liquid crystal layer 15. The light is incident upon the front-side absorption polarization plate 16, and absorbed by the absorption polarization plate 16.

Therefore, the display at the non-electric-field time in the transmission display using the one surface (front surface of the first liquid crystal display unit 10A) as the display side is the bright display (colored display), and the display at the electric field application time (V>Vth) is the dark display (black display).

Next, at the time of the reflection display using the other surface as the display side, as shown in FIG. 3A, for two linear polarized-light components crossing at right angles to each other of the outside light (non-polarized light) incident upon the second liquid crystal display unit 10B from the front side, the linear polarized-light component having the vibration plane parallel to the absorption axis of the front-side absorption polarization plate 16 of the second liquid crystal display unit 10B is absorbed by the absorption polarization plate 16. The linear polarized-light component having the vibration plane parallel to the transmission axis 16a of the absorption polarization plate 16 is transmitted through the absorption polarization plate 16 to form the linearly polarized light P parallel to the transmission axis 16a of the absorption polarization plate 16. The light is incident upon the liquid crystal cell 11 of the second liquid crystal display unit 10B from the front side.

The linearly polarized light P incident upon the liquid crystal cell 11 on the front side undergoes birefringence by the liquid crystal layer 15 in accordance with the aligned state of the liquid crystal molecule, which changes by the electric field applied between the electrodes of the liquid crystal cell 11, and is emitted on the rear side of the liquid crystal cell 11. The light is intercepted by the rear-side absorption polarization plate 17 or transmitted through the rear-side absorption polarization plate 17 and is emitted on the rear side of the second liquid crystal display unit 10B.

That is, the aligned state of the liquid crystal molecule at the non-electric-field time (V=0) when the electric field is not applied between the electrodes of the liquid crystal cell 11 is the twist alignment at the twist angle substantially of 90°. At this time, as shown on the left side of FIG. 3A, the linearly polarized light P incident upon the liquid crystal cell 11 through the front-side absorption polarization plate 16 turns substantially by 90° by the birefringence of the liquid crystal layer 15 to form the linearly polarized light S parallel to the transmission axis 17a of the rear-side absorption polarization plate 17, and is emitted on the rear side of the liquid crystal cell 11. Therefore, at the non-electric-field time, the linearly polarized light S emitted on the rear side of the liquid crystal cell 11 is transmitted through the rear-side absorption polarization plate 17 and emitted on the rear side of the second liquid crystal display unit 10B.

The linearly polarized light P emitted on the rear side of the second liquid crystal display unit 10B is incident upon the irradiation member 20.

Moreover, the transmission axis 22a of the second reflection polarization element 22 on the second liquid crystal display unit 10B side of the irradiation member 20 is substantially parallel to the transmission axis 17a of the rear-side absorption polarization plate 17 of the second liquid crystal display unit 10B. Therefore, most of the linearly polarized light S emitted on the rear side of the second liquid crystal display unit 10B and incident upon the irradiation member 20 is transmitted through the second reflection polarization element 22.

The linearly polarized light S transmitted through the second reflection polarization element 22 is transmitted through the light guide plate 25 of the plane light source 24 and is incident upon the first reflection polarization element 21 of the irradiation member 20 and is reflected by the first reflection polarization element 21.

That is, since the transmission axes 22a, 21a of the second reflection polarization element 22 and first reflection polarization element 21 substantially cross at right angles to each other, the linearly polarized light S transmitted through the second reflection polarization element 22 and incident upon the first reflection polarization element 21 has the linear polarized-light component having the vibration plane parallel to the reflection axis 21b of the first reflection polarization element 21. Therefore, most of the light is reflected by the first reflection polarization element 21.

Next, the linearly polarized light S reflected by the first reflection polarization element 21 is transmitted through the light guide plate 25 of the plane light source 24 again, and further transmitted through the second reflection polarization element 22. The light is emitted from the surface disposed opposite to the second liquid crystal display unit 10B of the irradiation member 20, and is incident upon the second liquid crystal display unit 10B on the rear side.

The linearly polarized light S incident upon the second liquid crystal display unit 10B is transmitted through the rear-side absorption polarization plate 17 of the second liquid crystal display unit 10B. The light is turned substantially by 90° by the liquid crystal layer 15 of the liquid crystal cell 11 to form the linearly polarized light P parallel to the transmission axis 16a of the front-side absorption polarization plate 16. The light is transmitted through the front-side absorption polarization plate 16 and emitted on the front side of the second liquid crystal display unit 10B.

On the other hand, at the electric field application time (V>Vth) when the electric field is applied between the electrodes of the liquid crystal cell 11 of the second liquid crystal display unit 10B so as to raise and align the liquid crystal molecules substantially vertically to the substrates 12, 13 planes, as shown on the right side of FIG. 3A, the linearly polarized light P incident upon the second liquid crystal display unit 10B on the front side, transmitted through the absorption polarization plate 16 on the front side, and incident upon the liquid crystal cell 11 is transmitted through the liquid crystal cell 11 still in the polarized state without undergoing any birefringence by the liquid crystal layer 15. The light is incident upon the rear-side absorption polarization plate 17, and absorbed by the rear-side absorption polarization plate 17.

Therefore, the display at the non-electric-field time in the reflection display using the other surface (front surface of the second liquid crystal display unit 10B) as the display side is the bright display (colored display), and the display at the electric field application time (V>Vth) is the dark display (black display).

At the time of the transmission display using the other surface as the display side, in the same manner as in the transmission display using the one surface as the display side, the light emitting elements 26 of the plane light source 24 of the irradiation member 20 are lit. The linearly polarized light P is emitted on the first liquid crystal display unit 10A side from the irradiation member 20, and the linearly polarized light S is emitted on the second liquid crystal display unit 10B side.

The linearly polarized light S emitted on the second liquid crystal display unit 10B side from the irradiation member 20 is transmitted through the absorption polarization plate 17 on the rear side of the second liquid crystal display unit 10B and incident upon the liquid crystal cell 11 on the rear side. The light undergoes birefringence by the liquid crystal layer 15 in accordance with the aligned state of the liquid crystal molecule, which changes by the electric field applied between the electrodes of the liquid crystal cell 11, and is emitted on the front side of the liquid crystal cell 11.

That is, at the non-electric-field time (V=0) when the electric field is not applied between the electrodes of the liquid crystal cell 11, as shown on the left side of FIG. 3B, the linearly polarized light S incident upon the liquid crystal cell 11 from the rear side is turned substantially by 90° by the birefringence the liquid crystal layer 15. The linearly polarized light P parallel to the transmission axis 16a of the front-side absorption polarization plate 16 is formed. The linearly polarized light P is transmitted through the front-side absorption polarization plate 16, and emitted on the front side of the second liquid crystal display unit 10B.

On the other hand, at the electric field application time (V>Vth) when the electric field is applied between the electrodes of the liquid crystal cell 11 of the second liquid crystal display unit 10B so as to raise and align the liquid crystal molecules substantially vertically to the substrates 12, 13 planes, as shown on the right side of FIG. 3B, the linearly polarized light S incident upon the liquid crystal cell 11 on the rear side is transmitted through the liquid crystal cell 11 still in the polarized state without undergoing any birefringence by the liquid crystal layer 15. The light is incident upon the front-side absorption polarization plate 16, and absorbed by the absorption polarization plate 16.

Therefore, the display at the non-electric-field time in the transmission display using the other surface (front surface of the second liquid crystal display unit 10B) as the display side is the bright display (colored display), and the display at the electric field application time (V>Vth) is the dark display (black display).

In this manner, in the display device, at the time of the reflection display using the one surface (front surface of the first liquid crystal display unit 10A) as the display side, the light incident upon the front side of the first liquid crystal display unit 10A and transmitted through the first liquid crystal display unit 10A is transmitted through the reflection polarization element 21 on the first liquid crystal display unit 10A side of the irradiation member 20, and reflected by the reflection polarization element 22 on the second liquid crystal display unit 10B side. Moreover, at the time of the reflection display using the other surface (front side of the second liquid crystal display unit 10B) as the display side, the light incident upon the front side of the second liquid crystal display unit 10B and transmitted through the second liquid crystal display unit 10B is transmitted through the reflection polarization element 22 on the second liquid crystal display unit 10B side of the irradiation member 20, and reflected by the reflection polarization element 21 on the first liquid crystal display unit 10A side.

According to the display device, each of one pair of reflection polarization elements 21, 22 of the irradiation member 20 reflects one of two different linear polarized-light components of the incident light at a high reflectance substantially without absorbing the component, and transmits the other linear polarized-light component at a high transmittance substantially without absorbing the component. Therefore, either one of the opposite surfaces can be the display surface, and reflection display can be performed with sufficient brightness.

Additionally, in this embodiment, one pair of reflection polarization elements 21, 22 of the irradiation member 20 are disposed so that the transmission axes 21a, 22a substantially cross at right angles to each other. That is, the transmission axis 21a of one reflection polarization element 21 is disposed substantially in parallel with the reflection axis 22b of the other reflection polarization element 22. Therefore, at the time of the reflection display using the one surface as the display side, most of the linearly polarized light P transmitted through the first liquid crystal display unit 10A and incident upon the irradiation member 20 from the one surface is reflected by the irradiation member 20. At the reflection display time using the other surface as the display side, most of the linearly polarized light S transmitted through the second liquid crystal display unit 10B and incident upon the irradiation member 20 from the other surface can be reflected by the irradiation member 20. Therefore, either one of the opposite surfaces can be the display side, and the display can be brighter.

For the irradiation member 20, in one pair of reflection polarization elements 21, 22, most of the light incident upon one reflection polarization element, reflected by the other reflection polarization element, and again incident upon the one reflection polarization element is transmitted through the one reflection polarization element and emitted. However, a part of the light again incident upon the one reflection polarization element is reflected by this reflection polarization element, multi-reflected between one pair of reflection polarization elements 21, 22, transmitted through the one reflection polarization element, and emitted.

That is, the irradiation member 20 emits a large part of the light incident upon either one of the opposite surfaces on the incident side by one reflection by the reflection polarization element 22 or 21 on a side opposite to the incident side. The member also multi-reflects a part of the light between one pair of reflection polarization elements 21, 22, and emits the multi-reflected light on the incident side from the periphery of the light emitted by one reflection.

Therefore, according to the display device, even when either one of the opposite surfaces is used as the display side, the reflected light emitted on the incident side of the irradiation member 20 by one reflection by the reflection polarization element 21 or 22 on the side opposite to the incident side of the irradiation member 20, and the reflected light multi-reflected between one pair of reflection polarization elements 21, 22 of the irradiation member 20 and emitted on the incident side of the irradiation member 20 from the periphery of the light emitted by one reflection can be emitted from the display surface. Therefore, an emission area of the light from the bright display portion is enlarged, and the bright display portion is entirely brightened. Additionally, the shade of the dark display by the liquid crystal display units 10A, 10B is eliminated, and the reflection display with a satisfactory quality can be performed without any double image.

Moreover, for the display device of this embodiment, in the irradiation member 20, the plane light source 24 is further disposed including: the light guide plate 25 disposed between one pair of reflection polarization elements 21, 22 to transmit the lights incident upon the opposite surfaces and emit the incident light from the end surface from either one of the opposite surfaces; and the light emitting element 26 disposed opposite to the end surface of the light guide plate 25. According to this constitution, it is possible to perform the reflection display using the outside light in the opposite surfaces, and the transmission display using the illumination light from the plane light source 24.

Moreover, as described above, the irradiation member 20 emits the linearly polarized light P and linearly polarized light S having substantially the same strength on the first liquid crystal display unit 10A side and on the second liquid crystal display unit 10B side. Therefore, in the transmission display using either surface as the display side, a display having the same brightness can be obtained.

Additionally, in the embodiment, in one pair of reflection polarization elements 21, 22 of the irradiation member 20, the transmission axis 21a of the reflection polarization element 21 on the first liquid crystal display unit 10A side is disposed substantially in parallel with the transmission axis 17a of the absorption polarization plate 17 on the rear side of the first liquid crystal display unit 10A. The transmission axis 22a of the reflection polarization element 22 on the second liquid crystal display unit 10B side is disposed substantially in parallel with the transmission axis 17a of the absorption polarization plate 17 on the rear side of the second liquid crystal display unit 10B. Therefore, most of the light emitted on the rear side of the liquid crystal display units 10A, 10B is incident upon the reflection polarization elements 21, 22. Most of the light emitted from the reflection polarization elements 21, 22 can be incident upon the liquid crystal display units 10A, 10B. Therefore, in either the reflection display or the transmission display, the displays of the opposite surfaces can sufficiently be bright.

It is to be noted that in the above-described embodiment, the respective transmission axes 21a, 22a of one pair of reflection polarization elements 21, 22 of the irradiation member 20 are disposed substantially to cross at right angles to each other. However, the transmission axes 21a, 22a of one pair of reflection polarization elements 21, 22 may be disposed to obliquely intersect with each other. The light multi-reflected between these reflection polarization elements 21, 22 and emitted from the irradiation member 20 may be increased. Even in this case, an intersection angle of the transmission axes 21a, 22a of one pair of reflection polarization elements 21, 22 is set to an angle close to the right angle. The light emitted by one reflection by the reflection polarization element on the side opposite to the incident side of the irradiation member 20 is sufficiently secured. Accordingly, in the reflection display and transmission display using one surface as the display side, and in the reflection display and transmission display using the other surface as the display side, a sufficiently bright display can be obtained.

[Second Embodiment]

Figure 5:
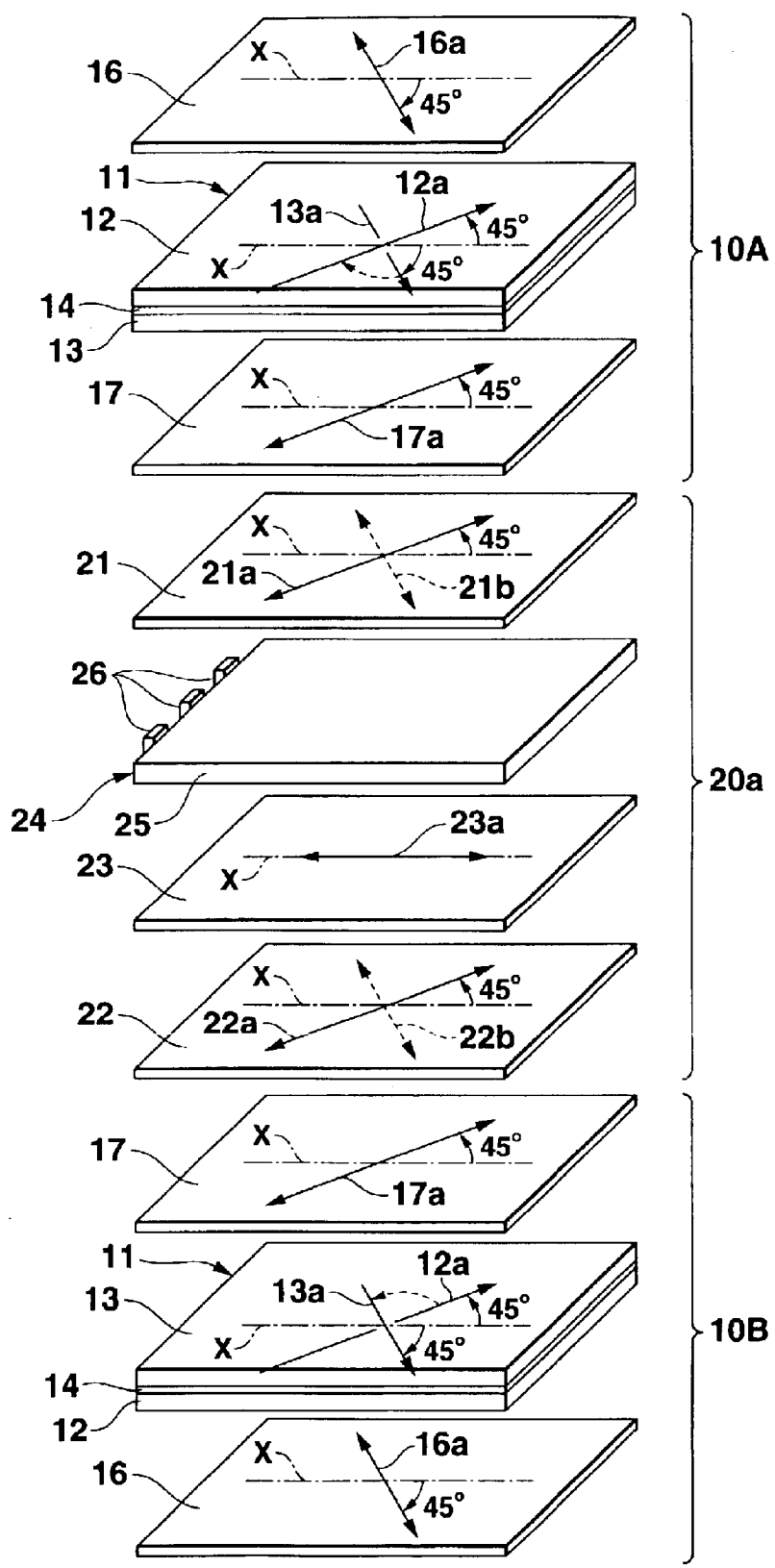
FIG. 5 is an exploded perspective view of the display device according a second embodiment of the present invention.
Figure 6:
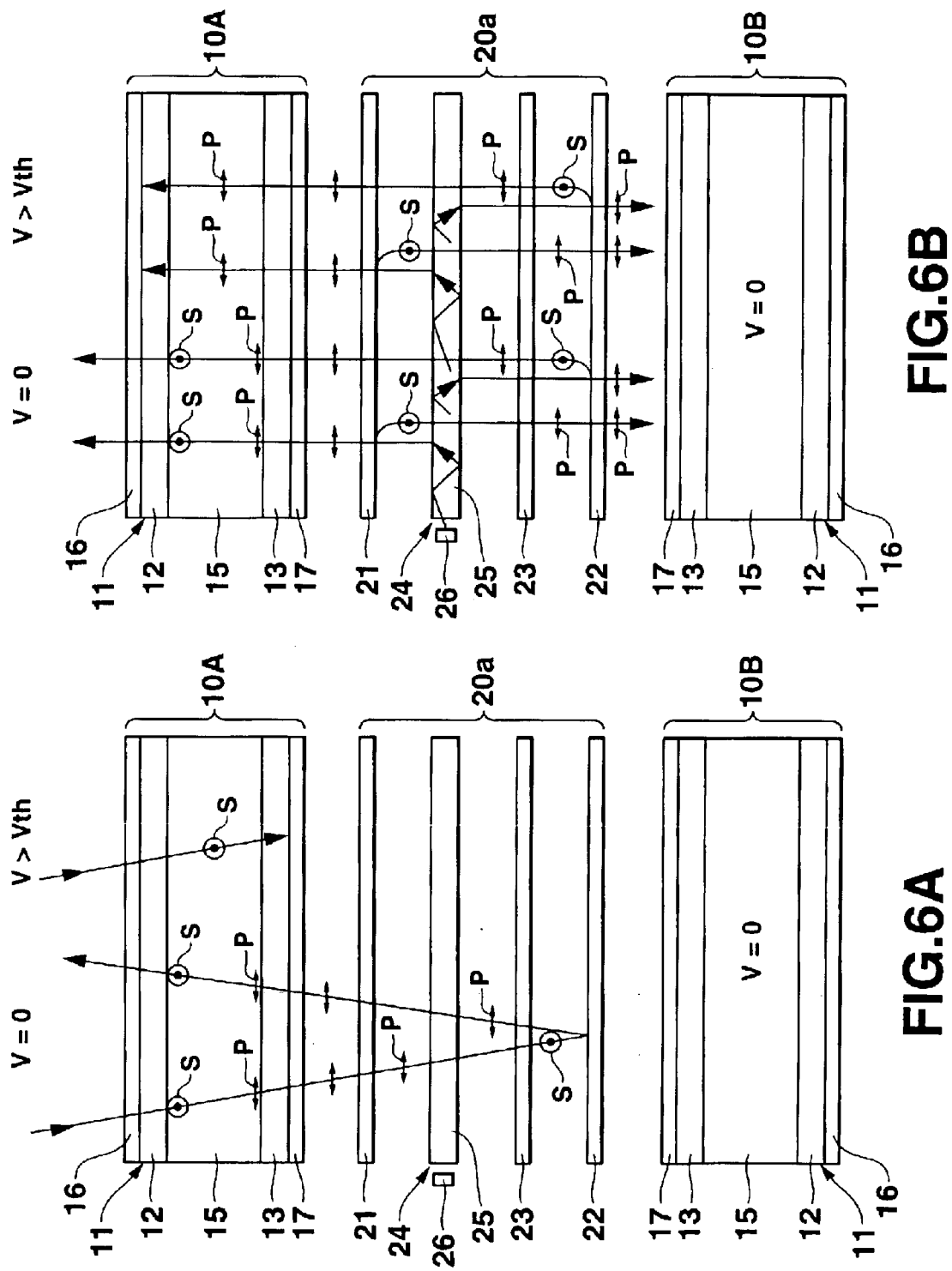
FIGS. 6A, 6B are diagrams schematically showing transmission paths of an incident light at the time when one surface of the display device of the second embodiment is the display side.
Figure 7:
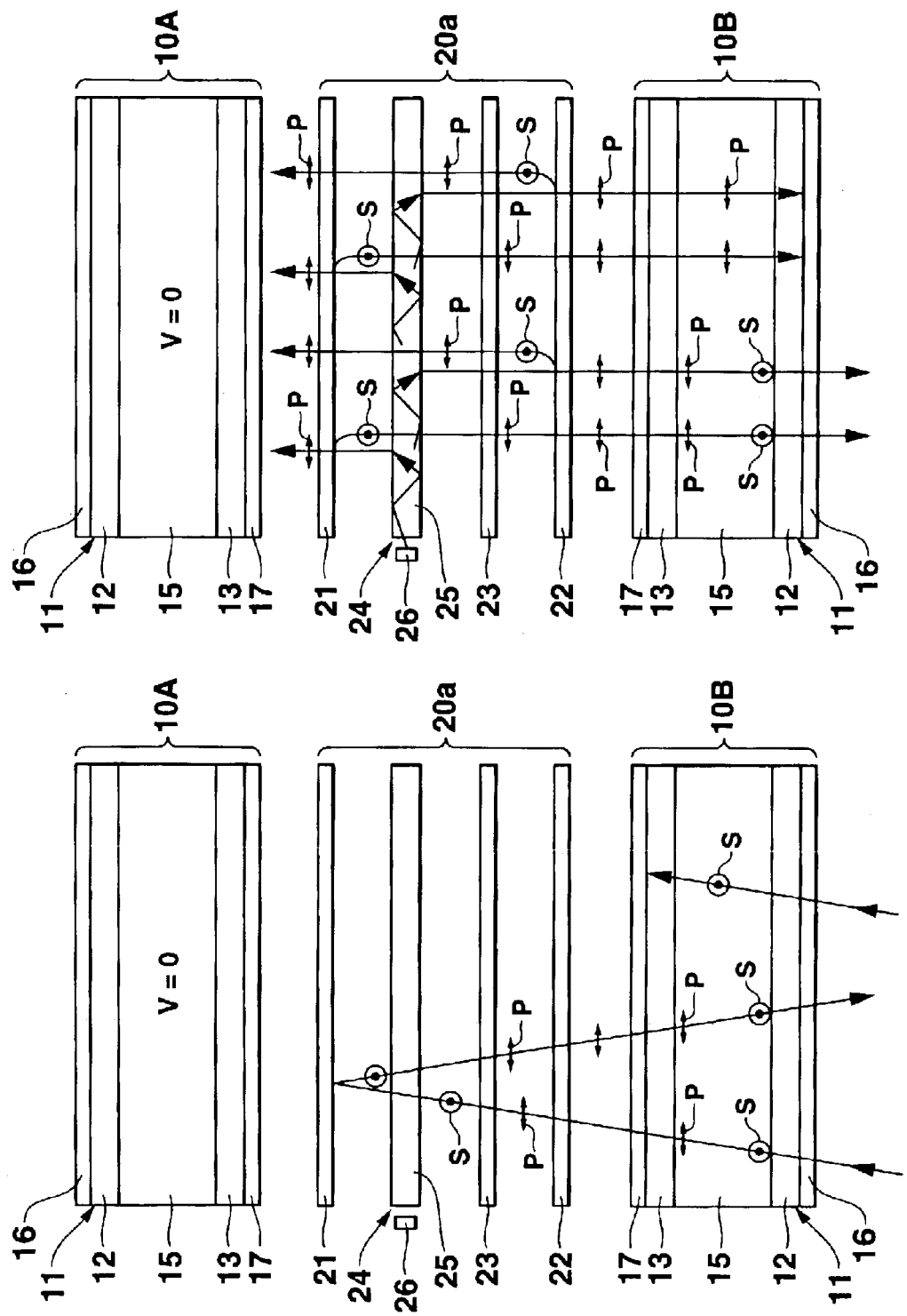
FIGS. 7A, 7B are diagrams schematically showing the transmission paths of the incident light at the time when the other surface of the display device of the second embodiment is the display side.

FIGS. 5 to 7A and 7B show a second embodiment of the present invention, FIG. 5 is an exploded perspective view of the display device, and FIGS. 6A, 6B and 7A, 7B are schematic sectional views showing the transmission paths of the incident light at the time when one surface of the display device is the display surface, and the other surface is the display surface.

For the display device of this embodiment, as shown in FIG. 5, between the first and second liquid crystal display units 10A, 10B whose rear surfaces are disposed opposite to each other in the opposite directions, an irradiation member 20a is disposed in which a retardation plate 23 and the plane light source 24 are held between one pair of reflection polarization elements 21, 22.

In this embodiment, the first liquid crystal display unit 10A and second liquid crystal display unit 10B are TN-type liquid crystal display units which basically have the same construction as that of the first embodiment. Moreover, since the plane light source 24 of the irradiation member 20a also has the same construction as that of the first embodiment, the same reference numerals are used in the drawings, and the description is omitted.

In this embodiment, the retardation plate 23 disposed between the first and second reflection polarization elements 21, 22 of the irradiation member 20a is, for example, a $\lambda/2$ retardation plate which gives a retardation of ½ wavelength between normal and abnormal lights of a transmitted light. In this embodiment, the $\lambda/2$ retardation plate 23 is disposed between the second reflection polarization element 22 and the light guide plate 25 of the plane light source 24.

In this embodiment, as shown in FIG. 5, for the first and second liquid crystal display units 10A, 10B, the respective liquid crystal molecule alignment directions 12a in the vicinity of the front-side substrates 12 and the liquid crystal molecule alignment directions 13a in the vicinity of the rear-side substrates 13 are disposed substantially to extend in parallel with or cross at right angles to each other (parallel in the drawing). The respective transmission axes 16a of the absorption polarization plates 16 on the front side of the first and second liquid crystal display units 10A, 10B are disposed substantially in parallel with each other. The respective transmission axes 17a of the absorption polarization plates 17 on the rear side opposite to the first and second liquid crystal display units 10A, 10B are disposed substantially in parallel with each other.

Furthermore, in this embodiment, the respective transmission axes 21a, 22a of the first and second reflection polarization elements 21, 22 of the irradiation member 20a are disposed substantially in parallel with each other. Moreover, the transmission axis 21a of the first reflection polarization element on the first liquid crystal display unit 10A side is disposed substantially in parallel with the transmission axis 17a of the absorption polarization plate 17 on the rear side of the first liquid crystal display unit 10A. The transmission axis 22a of the second reflection polarization element on the second liquid crystal display unit 10B side is disposed substantially in parallel with the transmission axis 17a of the absorption polarization plate 17 on the rear side of the second liquid crystal display unit 10B. A delay phase axis 23a of the $\lambda/2$ retardation plate 23 is disposed to obliquely deviate from both the transmission axes 21a, 22a of the first and second reflection polarization elements 21, 22 substantially by an angle of 45°.

The transmission path of the incident light at the time when one surface (front surface of the first liquid crystal display unit 10A) of the reflection display of the display device is used as the display side will be described. As in FIG. 6A showing the transmission path of the incident light in the reflection display using one surface as the display side, the outside light (non-polarized light) incident upon the first liquid crystal display unit 10A on the front side is formed in the linearly polarized light S parallel to the transmission axis 16a by the absorption polarization plate 16 on the front side of the first liquid crystal display unit 10A, and is incident upon the liquid crystal cell 11.

At the non-electric-field time (V=0) when the electric field is not applied between the electrodes of the liquid crystal cell 11, as shown on the left side of FIG. 6A, the linearly polarized light S incident upon the liquid crystal cell 11 is turned substantially by 90° by the liquid crystal layer 15 to form the linearly polarized light P parallel to the transmission axis 17a of the rear-side absorption polarization plate 17. The light is transmitted through the rear-side absorption polarization plate 17, emitted on the rear side of the first liquid crystal display unit 10A, and incident upon the irradiation member 20a.

The linearly polarized light P incident upon the irradiation member 20a is transmitted through the first reflection polarization element 21 of the irradiation member 20a and the light guide plate 25 of the plane light source 24. The retardation of ½ wavelength is given by the $\lambda/2$ retardation plate 23, and the linearly polarized light S is formed in which the vibration plane of the linearly polarized light P is rotated substantially by 90°. The light is incident upon the second reflection polarization element 22, and reflected by this second reflection polarization element 22.

The linearly polarized light S reflected by the second reflection polarization element 22 is formed as the linearly polarized light P again by the $\lambda/2$ retardation plate 23. The light is transmitted through the light guide plate 25 of the plane light source 24 and the first reflection polarization element 21, emitted from the irradiation member 20a, again transmitted through the first liquid crystal display unit 10A, and emitted on the front side.

On the other hand, at the electric field application time (V>Vth) when the electric field is applied between the electrodes of the liquid crystal cell 11 of the first liquid crystal display unit 10A so as to raise and align the liquid crystal molecules substantially vertically to the substrates 12, 13 planes, as shown on the right side of FIG. 6A, the linearly polarized light S incident upon the first liquid crystal display unit 10A on the front side, transmitted through the front-side absorption polarization plate 16, and incident upon the liquid crystal cell 11 is transmitted through the liquid crystal cell 11 still in the polarized state without undergoing any birefringence by the liquid crystal layer 15. The light is incident upon the rear-side absorption polarization plate 17, and most of the light is absorbed by the rear-side absorption polarization plate 17.

Therefore, the display at the non-electric-field time in the reflection display using the one surface (front surface of the first liquid crystal display unit 10A) as the display side is the bright display (colored display), and the display at the electric field application time (V>Vth) is the dark display (black display).

At the time of the transmission display using the one surface as the display side, as shown in FIG. 6B showing the transmission path of the incident light at the time of the transmission display using one surface as the display side, the light emitting element 26 of the plane light source 24 of the irradiation member 20a is lit. The outgoing light from the light emitting element 26 is emitted from the opposite surfaces of the light guide plate 25.

The illumination light emitted from the surface disposed to face the first reflection polarization element 21 of the light guide plate 25 is incident upon the first reflection polarization element 21. In the light (non-polarized light), the linearly polarized light S parallel to the reflection axis 21b of the first reflection polarization element 21 is reflected by the first reflection polarization element 21. The linearly polarized light P parallel to the transmission axis 21a of the first reflection polarization element 21 is transmitted through the first reflection polarization element 21 and emitted on the first liquid crystal display unit 10A side.

For the light emitted from the surface disposed to face the first reflection polarization element 21 of the light guide plate 25, the linearly polarized light S reflected by the first reflection polarization element 21 is transmitted through the light guide plate 25. The linearly polarized light P is formed by the $\lambda/2$ retardation plate 23 in which the vibration plane of the linearly polarized light S is rotated substantially by 90°. The light is transmitted through the second reflection polarization element 22, and emitted on the second liquid crystal display unit 10B side.

The illumination light emitted from the surface disposed to face the second reflection polarization element 22 of the light guide plate 25 is transmitted through the $\lambda/2$ retardation plate 23 still in a non-polarized light state, and is incident upon the second reflection polarization element 22. For the light (non-polarized light), the linearly polarized light S parallel to the reflection axis 22b of the second reflection polarization element 22 is reflected by this second reflection polarization element 22. The linearly polarized light P parallel to the transmission axis 22a of the second reflection polarization element 22 is transmitted through the second reflection polarization element 22 and emitted on the second liquid crystal display unit 10B side.

For the light emitted from the surface disposed opposite to the second reflection polarization element 22 of the light guide plate 25, the linearly polarized light S reflected by the second reflection polarization element 22 is formed into the linearly polarized light P by rotating the vibration plane of the linearly polarized light S substantially by 90° by the $\lambda/2$ retardation plate 23. The light is transmitted through the light guide plate 25, further through the first reflection polarization element 21, and emitted on the first liquid crystal display unit 10A side.

In this embodiment, the irradiation member 20a is constituted so that the transmission axes 21a, 22a of the first and second reflection polarization elements 21, 22 are disposed substantially in parallel with each other, and the plane light source 24 and $\lambda/2$ retardation plate 23 are disposed between the elements. Therefore, either the light emitted on the first liquid crystal display unit 10A side from the irradiation member 20a or the light emitted on the second liquid crystal display unit 10B side is the linearly polarized light P.

For the illumination light from the plane light source 24, the irradiation member 20a emits the linearly polarized light P emitted from the surface disposed opposite to the first reflection polarization element 21 of the light guide plate 25 and transmitted through the first reflection polarization element 21, and the linearly polarized light P emitted from the surface disposed opposite to the second reflection polarization element 22 of the light guide plate 25, reflected by the second reflection polarization element 22, and changed in the polarized state by the $\lambda/2$ retardation plate 23 on the first liquid crystal display unit 10A side. Moreover, the member emits the linearly polarized light P emitted from the surface disposed opposite to the second reflection polarization element 22 of the light guide plate 25 and transmitted through the second reflection polarization element 22, and the linearly polarized light P emitted from the surface disposed opposite to the first reflection polarization element 21 of the light guide plate 25, reflected by the first reflection polarization element 21, and changed in the polarized state by the $\lambda/2$ retardation plate 23 on the second liquid crystal display unit 10B side. Therefore, the strength of the linearly polarized light P emitted on the first liquid crystal display unit 10A side from the irradiation member 20a is subsequently the same as that of the linearly polarized light P emitted on the second liquid crystal display unit 10B side.

The linearly polarized light P emitted on the first liquid crystal display unit 10A side from the irradiation member 20a is transmitted through the absorption polarization plate 17 on the rear side of the first liquid crystal display unit 10A and incident upon the liquid crystal cell 11 on the rear side. The light undergoes the birefringence function of the liquid crystal layer 15 in accordance with the aligned state of the liquid crystal molecule, which changes by the electric field applied between the electrodes of the liquid crystal cell 11, and is emitted on the front side of the liquid crystal cell 11.

That is, at the non-electric-field time (V=0) when the electric field is not applied between the electrodes of the liquid crystal cell 11, as shown on the left side of FIG. 6B, the linearly polarized light P incident upon the liquid crystal cell 11 from the rear side is turned substantially by 90° by the birefringence function of the liquid crystal layer 15 to form the linearly polarized light S. The linearly polarized light S is transmitted through the front-side absorption polarization plate 16, and emitted on the front side of the first liquid crystal display unit 10A.

At the electric field application time (V>Vth) when the electric field is applied between the electrodes of the liquid crystal cell 11 of the first liquid crystal display unit 10A so as to raise and align the liquid crystal molecules substantially vertically to the substrates 12, 13 planes, as shown on the right side of FIG. 6B, the linearly polarized light P incident upon the liquid crystal cell 11 on the rear side is transmitted through the front-side absorption polarization plate 16 still in the polarized state without undergoing any birefringence by the liquid crystal layer 15. Most of the light is absorbed by the front-side absorption polarization plate 16.

Therefore, the display at the non-electric-field time in the transmission display using the one surface (front surface of the first liquid crystal display unit 10A) as the display side is the bright display (colored display), and the display at the electric field application time (V>Vth) is the dark display (black display).

Next, the transmission path of the incident light at the time when the other surface is used as the display side will be described. As shown in FIG. 7A showing the transmission path of the incident light at the time of the reflection display using the other surface as the display side, the outside light (non-polarized light) incident upon the second liquid crystal display unit 10B on the front side is formed into the linearly polarized light S parallel to the transmission axis 16a and incident upon the liquid crystal cell 11 by the absorption polarization plate 16 on the front side of the second liquid crystal display unit 10B.

At the non-electric-field time (V=0) when the electric field is not applied between the electrodes of the liquid crystal cell 11, as shown on the left side of FIG. 7A, the linearly polarized light S transmitted through the front-side absorption polarization plate 16 and incident upon the liquid crystal cell 11 is turned substantially by 90° to form the linearly polarized light P. The linearly polarized light P is transmitted through the rear-side absorption polarization plate 17, and emitted on the rear side of the second liquid crystal display unit 10B.

The linearly polarized light P emitted on the rear side of the second liquid crystal display unit 10B is incident upon the irradiation member 20a, transmitted through the second reflection polarization element 22, and formed into the linearly polarized light S by rotating the vibration plane of the linearly polarized light P substantially by 90° by the λ/2 retardation plate 23. The light is transmitted through the light guide plate 25 of the plane light source 24 and reflected by the first reflection polarization element 21.

The linearly polarized light S reflected by the first reflection polarization element 21 is again transmitted through the light guide plate 25 and formed again into the linearly polarized light P by the λ/2 retardation plate 23. The light is transmitted through the second reflection polarization element 22, emitted from the surface disposed opposite to the second liquid crystal display unit 10B of the irradiation member 20a, and incident upon the second liquid crystal display unit 10B on the rear side.

The linearly polarized light S incident upon the second liquid crystal display unit 10B is transmitted through the absorption polarization plate 17 on the rear side of the second liquid crystal display unit 10B, and turned substantially by 90° by the liquid crystal layer 15 of the liquid crystal cell 11 to form the linearly polarized light S. The light is transmitted through the front-side absorption polarization plate 16 and emitted on the front side of the second liquid crystal display unit 10B.

At the electric field application time (V>Vth) when the electric field is applied between the electrodes of the liquid crystal cell 11 of the second liquid crystal display unit 10B so as to raise and align the liquid crystal molecules substantially vertically to the planes of the substrates 12, 13, as shown on the right side of FIG. 7A, the linearly polarized light P incident upon the second liquid crystal display unit 10B on the front side, transmitted through the front-side absorption polarization plate 16, and incident upon the liquid crystal cell 11 is incident upon the rear-side absorption polarization plate 17 still in the polarized state without undergoing the birefringence by the liquid crystal layer 15. The light is absorbed by this absorption polarization plate 17.

Therefore, the display at the non-electric-field time in the reflection display using the other surface (front surface of the second liquid crystal display unit 10B) as the display side is the bright display (colored display), and the display at the electric field application time (V>Vth) is the dark display (black display).

On the other hand, at the time of the transmission display using the other surface as the display side, in the same manner as in the transmission display using the one surface as the display side, the light emitting element 26 of the plane light source 24 of the irradiation member 20a is lit. The linearly polarized light P is emitted on the first liquid crystal display unit 10A side and on the second liquid crystal display unit 10B side from the irradiation member 20a.

The linearly polarized light P emitted on the second liquid crystal display unit 10B side from the irradiation member 20a is transmitted through the absorption polarization plate 17 on the rear side of the second liquid crystal display unit 10B and incident upon the liquid crystal cell 11 on the rear side. The light undergoes birefringence by the liquid crystal layer 15 in accordance with the aligned state of the liquid crystal molecule, which changes by the electric field applied between the electrodes of the liquid crystal cell 11, and is emitted on the front side of the liquid crystal cell 11.

That is, at the non-electric-field-time (V=0) when the electric field is not applied between the electrodes of the liquid crystal cell 11, as shown on the left side of FIG. 7B showing the transmission path of the incident light at the time of the transmission display using the other surface as the display side, the linearly polarized light P incident upon the liquid crystal cell 11 on the rear side is turned substantially by 90° by the liquid crystal layer 15. The linearly polarized light S parallel to the transmission axis 16a of the front-side absorption polarization plate 16 is formed, emitted on the front side of the liquid crystal cell 11, transmitted through the front-side absorption polarization plate 16, and emitted on the front side of the second liquid crystal display unit 10B.

At the electric field application time (V>Vth) when the electric field is applied between the electrodes of the liquid crystal cell 11 of the second liquid crystal display unit 10B so as to raise and align the liquid crystal molecules substantially vertically to the substrates 12, 13 planes, as shown on the right side of FIG. 7B, the linearly polarized light P incident upon the liquid crystal cell 11 on the rear side is transmitted through the liquid crystal cell 11 still in the polarized state without undergoing the birefringence by the liquid crystal layer 15. The light is incident upon the front-side absorption polarization plate 16, and absorbed by the absorption polarization plate 16.

Therefore, the display at the non-electric-field time in the transmission display using the other surface (front surface of the second liquid crystal display unit 10B) as the display side is the bright display (colored display), and the display at the electric field application time (V>Vth) is the dark display (black display).

In this manner, in the display device of this embodiment, between the first and second liquid crystal display units 10A, 10B, the irradiation member 20a is disposed including the retardation plate 23 for changing the polarized state of the transmitted light between one pair of reflection polarization elements 21, 22. Accordingly, at the time of the reflection display using one surface (front surface of the first liquid crystal display unit 10A) as the display side, the light incident upon the front side of the first liquid crystal display unit 10A and transmitted through the first liquid crystal display unit 10A is transmitted through the reflection polarization element 21 on the first liquid crystal display unit 10A of the irradiation member 20a. The light is reflected by the reflection polarization element 22 on the second liquid crystal display unit 10B side. At the time of the reflection display using the other surface (front surface of the second liquid crystal display unit 10B) as the display side, the light incident upon the front side of the second liquid crystal display unit 10B and transmitted through this second liquid crystal display unit 10B is transmitted through the reflection polarization element 22 on the second liquid crystal display unit 10B side. The light is reflected by the reflection polarization element 21 on the first liquid crystal display unit 10A side.

According to the display device, each of one pair of reflection polarization elements 21, 22 of the irradiation member 20a reflects one of two different linear polarized-light components of the incident light at the high reflectance substantially without absorbing the component, and transmits the other linear polarized-light component at the high transmittance substantially without absorbing the component. Moreover, the λ/2 retardation plate 23 disposed between one pair of reflection polarization elements 21, 22 also transmits the incident light at the high transmittance substantially without absorbing the light. Therefore, either one of the opposite surfaces can be used as the display side, and a sufficiently bright reflection display can be enabled.

Additionally, in the above-described embodiment, one pair of reflection polarization elements 21, 22 of the irradiation member 20a are disposed so that the transmission axes 21a, 22a are disposed substantially in parallel with each other. The λ/2 retardation plate 23 for giving the retardation of ½ wavelength between the normal and abnormal lights of the transmitted lights is disposed between the elements. Therefore, at the time of the reflection display using the one surface as the display side, most of the linearly polarized light P transmitted through the first liquid crystal display unit 10A and incident upon the irradiation member 20a from the one surface is reflected by the irradiation member 20a. At the reflection display time using the other surface as the display side, most of the linearly polarized light S transmitted through the second liquid crystal display unit 10B and incident upon the irradiation member 20a from the other surface can be reflected by the irradiation member 20a. Therefore, either of the opposite surfaces can be used as the display side, and further the display can be bright.

It is to be noted that also in the display device of this embodiment, the irradiation member 20a emits a large part of the incident light on the incident side by one reflection by the reflection polarization element 22 or 21 on the side opposite to the incident side. The member also multi-reflects a part of the light between one pair of reflection polarization elements 21, 22, and emits the multi-reflected light on the incident side from the periphery of the light emitted by one reflection. Therefore, the emission area of the light from the bright display portion is enlarged, and the bright display portion is entirely brightened. Additionally, the shade of the dark display by the liquid crystal display units 10A, 10B is eliminated, and the reflection display with the satisfactory quality can be performed without any double image.

Moreover, also in the display device, the plane light source 24 and retardation plate 23 are disposed to constitute the irradiation member 20a between one pair of reflection polarization elements 21, 22. Therefore, it is possible to perform the reflection display using the outside light in the opposite surfaces, and the transmission display using the illumination light from the plane light source 24.

In this embodiment, in one pair of reflection polarization elements 21, 22 of the irradiation member 20a, the transmission axes 21a, 22a are disposed substantially in parallel with each other. The λ/2 retardation plate 23 is disposed between these reflection polarization elements 21, 22. However, the transmission axes 21a, 22a of one pair of reflection polarization elements 21, 22 may be disposed to obliquely intersect with each other at an arbitrary angle. Between these reflection polarization elements 21, 22, the retardation plate may also be disposed which has a retardation to change the polarized state of the incident light transmitted through one reflection polarization element to the polarized state reflected by the other reflection polarization element.

The intersection angle of the transmission axes 21a, 22a of one pair of reflection polarization elements 21, 22 and the retardation of the retardation plate may also be set so as to increase the light multi-reflected between one pair of reflection polarization elements 21, 22 and emitted from the irradiation member 20a. Even in this case, it is possible to sufficiently secure the light emitted by one reflection by the reflection polarization element on the side opposite to the incident side of the irradiation member 20a. Accordingly, at the time of either the reflection display or the transmission display using the one surface as the display side, or either the reflection display or the transmission display using the other surface as the display side, it is possible to obtain a dark display by the interception of the incident light by the liquid crystal display units 10A, 10B, and a sufficiently bright display by the reflection of the transmitted light.

The retardation plate may also be a laminate of lens sheets for imparting directivity to the transmitted light. When this lens sheet laminate retardation plate is used, a front-surface luminance of the light emitted on the front side of the display device is raised, and a brighter display can be obtained.

In the embodiment, the irradiation member 20a is constituted so that the retardation plate 23 is disposed between the second reflection polarization element 22 on the second liquid crystal display unit 10B side and the plane light source 24. However, the retardation plate 23 may also be disposed between the first reflection polarization element 21 on the first liquid crystal display unit 10A side and the plane light source 24.

Furthermore, in the embodiment, the irradiation member 20a is constituted so that the retardation plate 23 and plane light source 24 are disposed between one pair of reflection polarization elements 21, 22, but the light guide plate of the plane light source 24 may also be used as the retardation plate.

[Third Embodiment]

Figure 8:
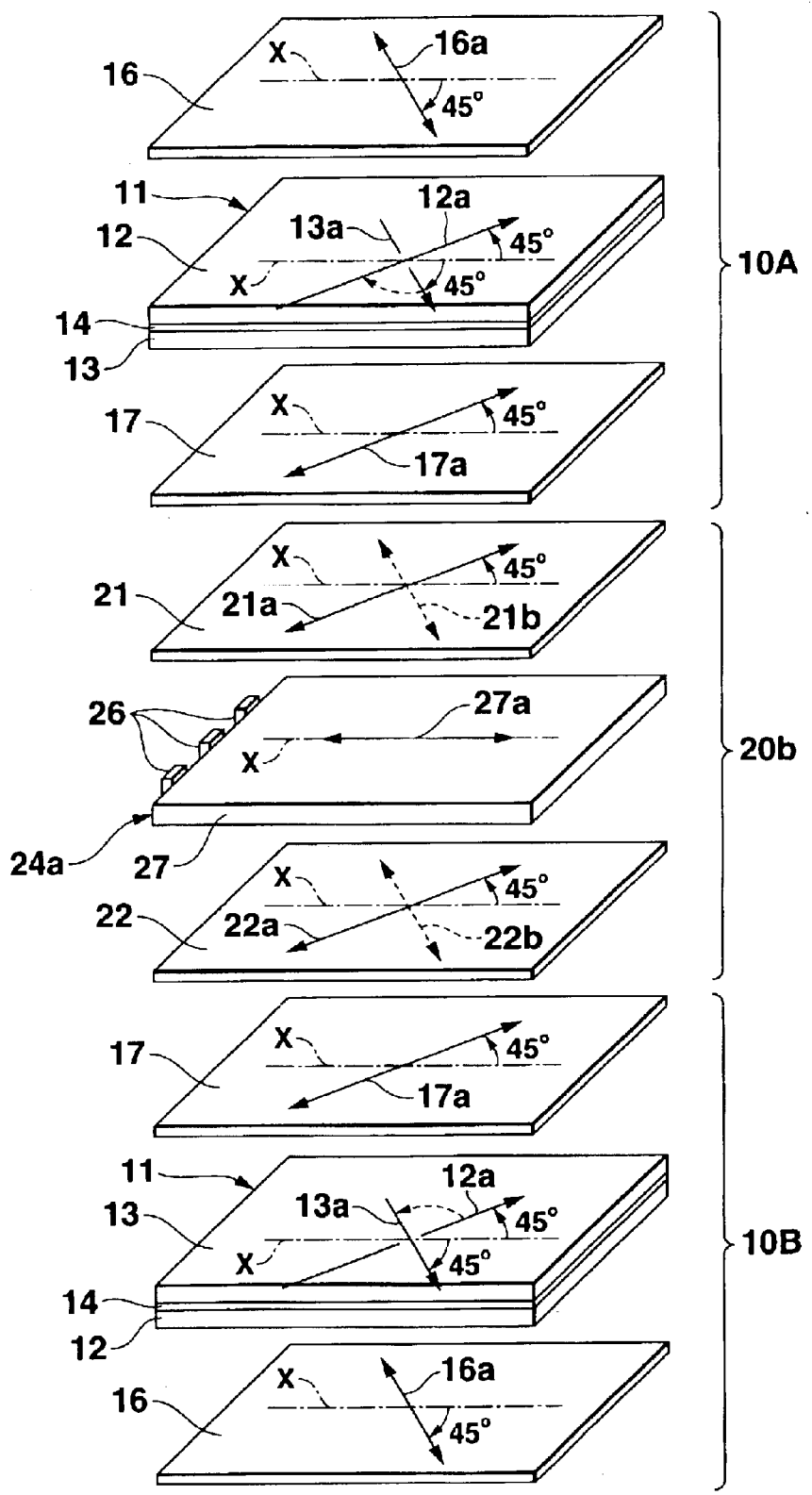
FIG. 8 is an exploded perspective view of the display device showing a third embodiment of the present invention.

FIG. 8 is an exploded perspective view of the display device showing a third embodiment of the present invention. In this embodiment, between the first liquid crystal display unit 10A and second liquid crystal display unit 10B whose rear surfaces are disposed opposite to each other in the opposite directions, an irradiation member 20b is disposed in which a plane light source 24a including a light guide plate 27 of the retardation plate and light emitting elements 26 disposed opposite to the end surface of the plate on the end surface of the plate is disposed between one pair of reflection polarization elements 21, 22.

In the embodiment, the light guide plate 27 is used as the λ/2 retardation plate which gives the retardation of ½ wavelength between the normal and abnormal lights of the transmitted light. One pair of reflection polarization elements 21, 22 of the irradiation member 20b are disposed so that the respective transmission axes 21a, 22a are disposed substantially in parallel with each other. The light guide plate 27 including the λ/2 retardation plate is disposed so that a delay phase axis 27a obliquely deviates from the respective transmission axes 21a, 22a of the reflection polarization elements 21, 22 substantially at the angle of 45°.

According to the display device of this embodiment, the light guide plate 27 of the plane light source 24a can be used to change the polarized state of the light transmitted between one pair of reflection polarization elements 21, 22. Therefore, as compared with the second embodiment in which the retardation plate 23 and plane light source 24 are disposed between one pair of reflection polarization elements 21, 22, the constitution of the irradiation member 20b can be simplified and miniaturized.

In the first to third embodiments, one pair of polarized-light split elements for the irradiation members 20, 20a, 20b are the reflection polarization elements 21, 22 including the reflection polarization plates. However, the polarized-light split element is not limited to the reflection polarization plate as long as one of two different polarized-light components of the incident light is reflected and the other polarized-light component is transmitted.

Figure 9:
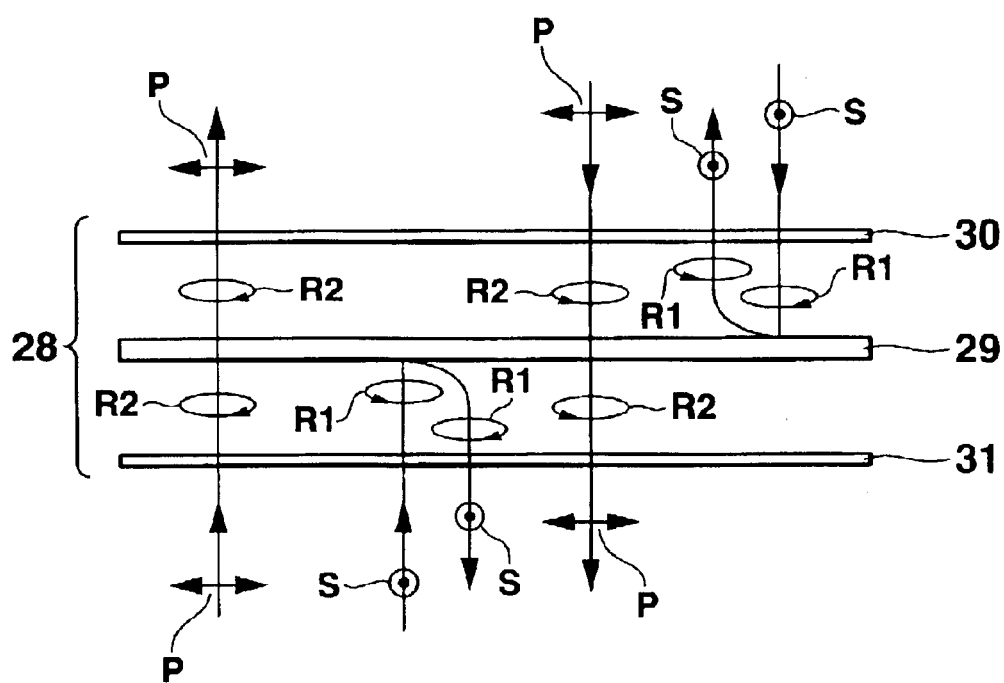
FIG. 9 is an exploded side view of another polarized-light split element.

FIG. 9 is an exploded side view of another polarized-light split element. A polarized-light split element 28 reflects one of two linear polarized-light components of the incident light crossing at right angles to each other, and transmits the other polarized-light component.

The polarized-light split element 28 is constituted of: a circular polarized-light split layer (e.g., cholesteric liquid crystal film) 29 which reflects one of two clockwise and counterclockwise circular polarized-light components of the incident light and transmits the other circular polarized-light component; and one pair of retardation plates 30, 31 which are disposed to hold the circular polarized-light split layer and which allow a linear polarized light to be incident upon the circular polarized-light split layer 29 as a circular polarized light and emit the circular polarized light emitted from the circular polarized-light split layer 29 as the linear polarized light.

One pair of retardation plates 30, 31 are λ/4 retardation plates which give a retardation of ¼ wavelength between the normal and abnormal lights of the transmitted light. The respective delay phase axes of these retardation plates 30, 31 are disposed to substantially cross at right angles to each other.

The reflection polarization element 28 has a transmission axis in a direction deviating by 45° clockwise as seen from the upper side (outer-surface side of the upper retardation plate 30) with respect to one of two directions deviating from the delay phase axes of the pair of λ/4 retardation plates 30, 31 substantially by 45° and crossing at right angles to each other, for example, the delay phase axis of the retardation plate on the upper side in the drawing (hereinafter referred to as the upper retardation plate) 30. The element has a reflection axis in another direction (direction deviating by 45° counterclockwise as seen from the upper side with respect to the delay phase axis of the lower retardation plate 31) crossing at right angles to the direction of the transmission axis. For two linear polarized-light components of the incident light crossing at right angles to each other, the element reflects one linear polarized-light component having the vibration plane parallel to the reflection axis, and transmits the other linear polarized-light component having the vibration plane parallel to the transmission axis.

That is, the reflection polarization element 28 allows the linearly polarized light S parallel to the reflection axis among the lights incident upon one-surface side, for example, the upper side in the drawing to be incident upon the circular polarized-light split layer 29 as a clockwise circular polarized light R1 toward a travel direction of the light (downward direction in the drawing) from the upper retardation plate 30. The linearly polarized light P parallel to the transmission axis is incident as a counterclockwise circular polarized light R2 upon the circular polarized-light split layer 29 toward the travel direction of the light by the upper retardation plate 30. Among the lights incident upon the other-surface side, that is, the lower side in the drawing, the linearly polarized light S parallel to the reflection axis is incident as the clockwise circular polarized light R1 upon the circular polarized-light split layer 29 toward the travel direction (upward direction in the drawing) of the light by the lower retardation plate 31. The linearly polarized light P parallel to the transmission axis is incident as the counterclockwise circular polarized light R2 upon the circular polarized-light split layer 29 toward the travel direction of the light by the lower retardation plate 31.

In FIG. 9, for the sake of convenience, rotation directions (directions of arrows) of the circular polarized lights R1, R2 are uniformly shown in the direction as seen from the upper side in the drawing. However, for these circular polarized lights R1, R2, the rotation directions seen from the directions toward the travel directions of the circular polarized lights R1, R2 directed to the lower side from the upper side in the drawing are the same as those of the drawing. The rotation directions seen from the directions toward the travel directions of the circular polarized lights R1, R2 of the light traveling to the upper side from the lower side in the drawing are reverse to those in the drawing.

With respect to the light incident upon either one of the opposite-surface sides, the circular polarized-light split layer 29 has a polarized light split characteristic of reflecting a clockwise circular polarized-light component toward the travel direction and transmitting a counterclockwise circular polarized-light component.

Therefore, among the lights incident upon the upper side in the drawing, the light incident upon the circular polarized-light split layer 29 as the clockwise circular polarized light R1 toward the travel direction by the upper retardation plate 30 is reflected by the circular polarized-light split layer 29. The reflected light R1 is emitted upwards as the linearly polarized light S parallel to the reflection axis by the upper retardation plate 30. The light incident upon the circular polarized-light split layer 29 as the counterclockwise circular polarized light R2 toward the travel direction by the upper retardation plate 30 is transmitted through the circular polarized-light split layer 29 and incident upon the lower retardation plate 31. The light is formed as the linearly polarized light P parallel to the transmission axis and emitted downwards by the lower retardation plate 31.

Among the lights incident upon the lower side in the drawing, the light formed as the clockwise circular polarized light R1 toward the travel direction by the lower retardation plate 31 and incident upon the circular polarized-light split layer 29 is reflected by the circular polarized-light split layer 29. The reflected light R1 is formed as the linearly polarized light S parallel to the reflection axis by the lower retardation plate 31 and emitted downwards. The light formed as the counterclockwise circular polarized light R2 toward the travel direction by the lower retardation plate 31 and incident upon the circular polarized-light split layer 29 is transmitted through the circular polarized-light split layer 29 and incident upon the upper retardation plate 30. The light is formed as the linearly polarized light P parallel to the transmission axis by the upper retardation plate 30 and emitted upwards.

In this manner, for two linear polarized-light components of the incident light crossing at right angles to each other, the reflection polarization element 28 reflects one polarized-light component having the vibration plane parallel to the reflection axis, and transmits the other polarized-light component having the vibration plane parallel to the transmission axis. Therefore, even when the reflection polarization element 28 is used instead of one pair of reflection polarization elements (reflection polarization plates) 21, 22 of the irradiation members 20, 20a, 20b in the above-described embodiments, an effect similar to that of each embodiment can be obtained.

[Fourth Embodiment]

Figure 10:
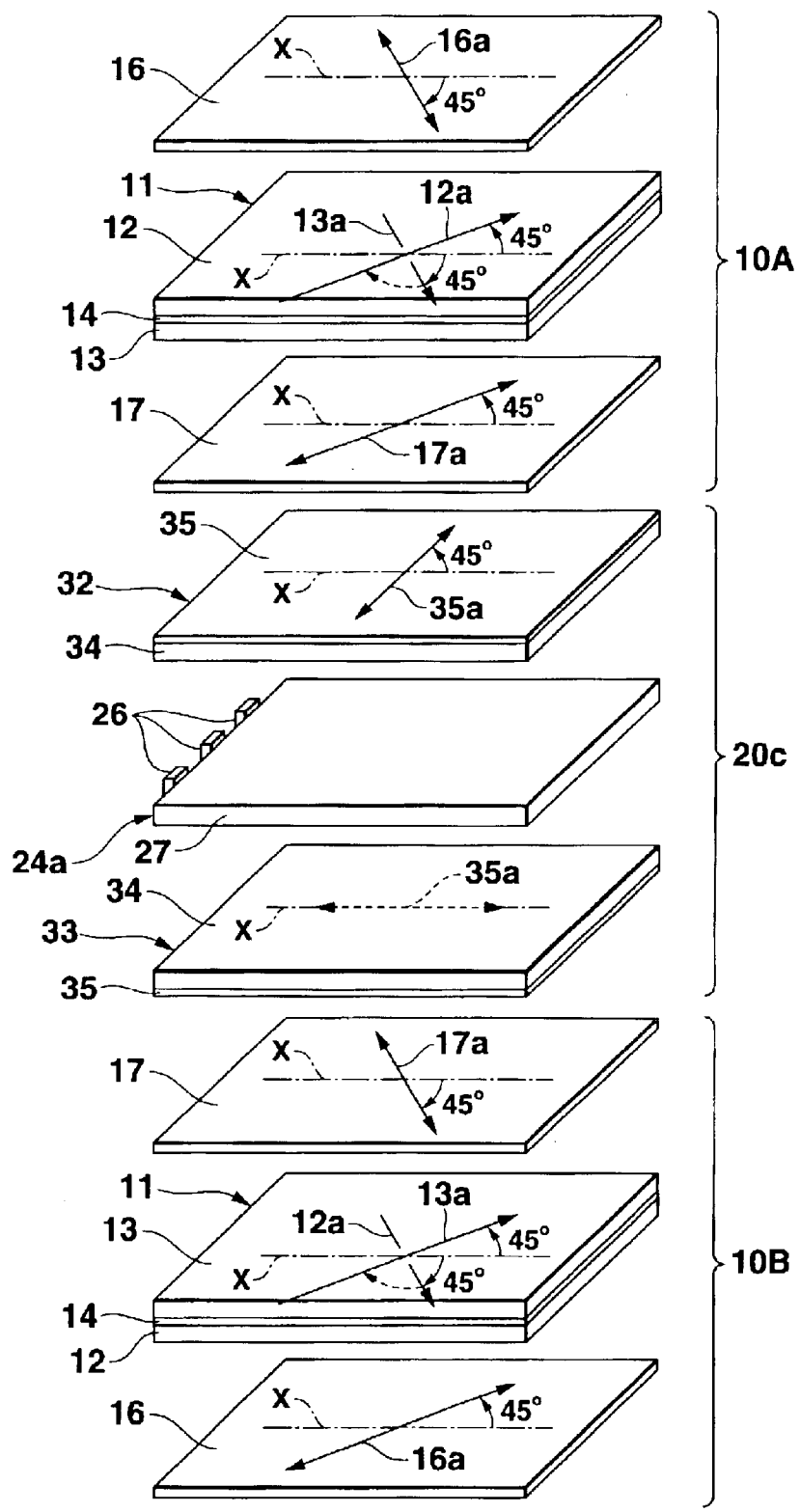
FIG. 10 is an exploded perspective view of the display device showing a fourth embodiment of the present invention.

FIGS. 10 to 12A and 12B show a fourth embodiment of the present invention, FIG. 10 is an exploded perspective view of the display device, and FIGS. 11A, 11B and 12A, 12B are schematic diagrams showing the transmission paths of the incident light at the time when one surface of the display device is the display surface, and the other surface is the display surface.

For the display device of this embodiment, as shown in FIG. 10, between the first and second liquid crystal display units 10A, 10B whose rear surfaces are disposed opposite to each other in the opposite directions, an irradiation member 20c is disposed. The member includes one pair of polarized-light split elements 32, 33 each including: a circular polarized-light split layer 34 for reflecting one of two clockwise and counterclockwise circular polarized-light components of the incident light and transmitting the other circular polarized-light component; and a retardation plate 35 which is disposed on one-surface side of the circular polarized-light split layer 34 and which allows the linearly polarized light incident upon the surface opposite to the surface disposed opposite to the circular polarized-light split layer 34 as the circular polarized light to be incident upon the circular polarized-light split layer 34 and which forms the circular polarized light emitted from the circular polarized-light split layer 34 into the linearly polarized light and emits the light from the opposite surface. The plane light source 24a is disposed between these polarized-light split elements 32, 33.

In this embodiment, the first liquid crystal display unit 10A and second liquid crystal display unit 10B are the TN type liquid crystal display units which basically have the same constitution as that of the first embodiment. Moreover, the plane light source 24a of the irradiation member 20c also has the same constitution as that of the first embodiment. Therefore, the same reference numerals are used in the drawings and the description is omitted.

In this embodiment, the circular polarized-light split layer 34 of one pair of polarized-light split elements 32, 33 of the irradiation member 20c are, for example, the cholesteric liquid crystal films. The retardation plate 35 disposed on the one-surface side of the circular polarized-light split layer 34 is the $\lambda/4$ retardation plate which gives the retardation of ¼ wavelength between the normal and abnormal lights of the transmitted light.

Each of one pair of polarized-light split elements 32, 33 reflects one of different polarized-light components of the incident light, and transmits the other polarized-light component. The linearly polarized light incident upon the one-surface side on which the $\lambda/4$ retardation plate 35 is disposed is formed into the circular polarized light turning in either one of counterclockwise and clockwise directions by the $\lambda/4$ retardation plate 35, and incident upon the circular polarized-light split layer 34. The light incident upon the other-surface side, that is, the outer-surface side of the circular polarized-light split layer 34 is incident upon the circular polarized-light split layer 34 as such. For the circular polarized light reflected by the circular polarized-light split layer 34, and the circular polarized light transmitted through the circular polarized-light split layer 34, the circular polarized light emitted on the outer-surface side of the circular polarized-light split layer 34 is emitted as such. The circular polarized light emitted on the surface side of the circular polarized-light split layer 34 on which the $\lambda/4$ retardation plate 35 is disposed is emitted as the linearly polarized light by the $\lambda/4$ retardation plate 35.

For the pair of polarized-light split elements 32, 33, the circular polarized-light split layer 34 of the polarized-light split element 32 on the first liquid crystal display unit 10A side (hereinafter referred to as the first polarized-light split element) has a polarized-light split characteristic of reflecting the clockwise circular polarized-light component toward the travel direction even with respect to the light incident upon either one of the opposite surfaces, and transmitting the counterclockwise circular polarized-light component. The $\lambda/4$ retardation plate 35 of the first polarized-light split element 32 is disposed by setting the direction of a delay phase axis 35a of the $\lambda/4$ retardation plate 35 so that the linearly polarized light emitted on the rear side of the first liquid crystal display unit 10A is changed into the counterclockwise circular polarized light R2 transmitted through the circular polarized-light split layer 34 and is incident upon the circular polarized-light split layer 34.

The circular polarized-light split layer 34 of the polarized-light split element 33 on the second liquid crystal display unit 10B side (hereinafter referred to as the second polarized-light split element) has a polarized-light split characteristic reverse to that of the circular polarized-light split layer 34 of the first polarized-light split element 32. That is, the layer reflects the counterclockwise circular polarized-light component toward the travel direction even with respect to the light incident upon either one of the opposite surfaces, and transmits the clockwise circular polarized-light component. The $\lambda/4$ retardation plate 35 of the second polarized-light split element 33 is disposed by setting the direction of the delay phase axis 35a of the $\lambda/4$ retardation plate 35 so that the linearly polarized light emitted on the rear side of the second liquid crystal display unit 10B is changed into the clockwise circular polarized light R1 transmitted through the circular polarized-light split layer 34 and is incident upon the circular polarized-light split layer 34.

In FIGS. 11A, 11B and 12A, 12B, for the sake of convenience, the rotation directions (directions of arrows) of the circular polarized lights R1, R2 are uniformly shown in the direction as seen from the upper side in the drawing. However, for these circular polarized lights R1, R2, the rotation directions seen from the directions toward the travel directions of the circular polarized lights R1, R2 directed to the lower side from the upper side in the drawing are the same as those of the drawing. The rotation directions seen from the directions toward the travel directions of the circular polarized lights R1, R2 of the light traveling to the upper side from the lower side in the drawing are reverse to those in the drawing.

For the pair of polarized-light split elements 32, 33, as shown in FIG. 10, the respective circular polarized-light split layers 34 are disposed opposite to each other. The delay phase axes 35a of the respective λ/4 retardation plates 35 are disposed to substantially cross at right angles to each other.

Moreover, the irradiation member 20c changes the linearly polarized light emitted on the rear side of the first liquid crystal display unit 10A into the counterclockwise circular polarized light R2 by the λ/4 retardation plate 35 of the first polarized-light split element 32. The light is incident upon the circular polarized-light split layer 34 of the first polarized-light split element 32. The member changes the linearly polarized light emitted on the rear side of the second liquid crystal display unit 10B into the counterclockwise circular polarized light R2 by the λ/4 retardation plate 35 of the second polarized-light split element 33. The light is incident upon the circular polarized-light split layer 34 of the second polarized-light split element 33. To achieve this, the delay phase axis 35a of the λ/4 retardation plate 35 of the first polarized-light split element 32 is directed in the direction substantially of 45° counterclockwise as seen from the front side with respect to the transmission axis 17a of the absorption polarization plate 17 on the rear side of the first liquid crystal display unit 10A. The delay phase axis 35a of the λ/4 retardation plate 35 of the second polarized-light split element 33 is disposed in the direction substantially of 45° counterclockwise as seen from the front side with respect to the transmission axis 17a of the absorption polarization plate 17 on the rear side of the second liquid crystal display unit 10B.

The transmission path of the incident light at a time when one surface (front surface of the first liquid crystal display unit 10A) of the reflection display of the display device is used as the display side will be described. As shown in FIG. 11A showing the transmission path of the incident light at the time of reflection display using one surface as the display side, the outside light (non-polarized light) incident upon the front side of the first liquid crystal display unit 10A is formed into the linearly polarized light S parallel to the transmission axis 16a by the absorption polarization plate 16 on the front side of the first liquid crystal display unit 10A, and incident upon the liquid crystal cell 11.

At the non-electric-field-time (V=0) when the electric field is not applied between the electrodes of the liquid crystal cell 11, as shown on the left side of FIG. 11A, the linearly polarized light S incident upon the liquid crystal cell 11 is turned substantially by 90° by the liquid crystal layer 15. The linearly polarized light P parallel to the transmission axis 17a of the rear-side absorption polarization plate 17 is formed, transmitted through the rear-side absorption polarization plate 17, emitted on the rear side of the first liquid crystal display unit 10A, and incident upon the irradiation member 20c.

The linearly polarized light P incident upon the irradiation member 20c is changed into the counter-clockwise circular polarized light R2 toward the travel direction and incident upon the circular polarized-light split layer 34 by the λ/4 retardation plate 35 of the first polarized-light split element 32. The light is transmitted through the circular polarized-light split layer 34 and emitted on the rear side of the first polarized-light split element 32.

The counterclockwise circular polarized light R2 emitted on the rear side of the first polarized-light split element 32 is transmitted through the light guide plate 25 of the plane light source 24 and reflected by the circular polarized-light split layer 34 of the second polarized-light split element 33. The reflected light R2 is again transmitted through the light guide plate 25 of the plane light source 24 and again incident upon the rear side of the first polarized-light split element 32.

The circular polarized light R2 again incident upon the rear side of the first polarized-light split element 32 is transmitted through the circular polarized-light split layer 34 of the first polarized-light split element 32, and further changed into the linearly polarized light P by the λ/4 retardation plate 35. The light is emitted on the first liquid crystal display unit 10A side, again transmitted through the first liquid crystal display unit 10A, and emitted on the front side of the unit.

On the other hand, at the electric field application time (V>Vth) when the electric field is applied between the electrodes of the liquid crystal cell 11 of the first liquid crystal display unit 10A so as to raise and align the liquid crystal molecules substantially vertically to the substrates 12, 13 planes, as shown on the right side of FIG. 11A, the linearly polarized light S incident upon the front side of the first liquid crystal display unit 10A, transmitted through the front-side absorption polarization plate 16, and incident upon the liquid crystal cell 11 is transmitted through the liquid crystal cell 11 still in the polarized state without undergoing the birefringence function of the liquid crystal layer 15. The light is incident upon the rear-side absorption polarization plate 17, and most of the light is absorbed by the rear-side absorption polarization plate 17.

Therefore, the display at the non-electric-field time in the reflection display using the one surface (front surface of the first liquid crystal display unit 10A) as the display side is the bright display (colored display), and the display at the electric field application time (V>Vth) is the dark display (black display).

On the other hand, at the time of the transmission display using the one surface as the display side, as shown in FIG. 11B showing the transmission path of the incident light at the time of the transmission display using the one surface as the display side, the light emitting element 26 of the plane light source 24 of the irradiation member 20c is lit. The outgoing light from the light emitting element 26 is emitted from the opposite surfaces of the light guide plate 25.

The illumination light emitted from the surface disposed opposite to the first polarized-light split element 32 of the light guide plate 25 is incident upon the circular polarized-light split layer 34 of the first polarized-light split element 32. Among the lights (non-polarized lights), the clockwise circular polarized-light component toward the travel direction is reflected by the circular polarized-light split layer 34.

The counterclockwise circular polarized-light component is transmitted through the circular polarized-light split layer 34. The counterclockwise circular polarized light R2 transmitted through the circular polarized-light split layer 34 is changed into the linearly polarized light P by the λ/4 retardation plate 35 and emitted on the first liquid crystal display unit 10A side.

Among the lights emitted from the surface disposed opposite to the first polarized-light split element 32 of the light guide plate 25, the clockwise circular polarized light R1 reflected by the circular polarized-light split layer 34 of the first polarized-light split element 32 is transmitted through the light guide plate 25. The light is further transmitted through the circular polarized-light split layer 34 of the second polarized-light split element 33, changed into the linearly polarized light S by the λ/4 retardation plate 35, and emitted on the second liquid crystal display unit 10B side.

The illumination light emitted from the surface disposed opposite to the second polarized-light split element 33 of the light guide plate 25 is incident upon the circular polarized-light split layer 34 of the second polarized-light split element 33. Among the lights (non-polarized lights), the counterclockwise circular polarized-light component toward the travel direction is reflected by the circular polarized-light split layer 34. The clockwise circular polarized-light component is transmitted through the circular polarized-light split layer 34 The clockwise circular polarized light R1 transmitted through the circular polarized-light split layer 34 is changed into the linearly polarized light S by the λ/4 retardation plate 35 and emitted on the second liquid crystal display unit 10B side.

Among the lights emitted from the surface disposed opposite to the second polarized-light split element 33 of the light guide plate 25, the counterclockwise circular polarized light R2 reflected by the circular polarized-light split layer 34 of the second polarized-light split element 33 is transmitted through the light guide plate 25. The light is further transmitted through the circular polarized-light split layer 34 of the first polarized-light split element 32, changed into the linearly polarized light P by the λ/4 retardation plate 35, and emitted on the first liquid crystal display unit 10A side.

That is, the irradiation member 20c splits the illumination light from the plane light source 24 into two linearly polarized lights P, S crossing at right angles to each other and having substantially the same strength. One linearly polarized light P is emitted on the first liquid crystal display unit 10A side, and the other linearly polarized light S is emitted on the second liquid crystal display unit 10B side.

The linearly polarized light P emitted on the first liquid crystal display unit 10A side from the irradiation member 20c is transmitted through the absorption polarization plate 17 on the rear side of the first liquid crystal display unit 10A, and incident upon the rear side of the liquid crystal cell 11. The light undergoes birefringence by the liquid crystal layer 15 in accordance with the aligned state of the liquid crystal molecules, which changes by the electric field applied between the electrodes of the liquid crystal cell 11, and is emitted on the front side of the liquid crystal cell 11.

That is, at the non-electric-field time (V=0) when the electric field is not applied between the electrodes of the liquid crystal cell 11, as shown on the left side of FIG. 11B, the linearly polarized light P incident upon the rear side of the liquid crystal cell 11 is turned subsequently by 90° by the birefringence function of the liquid crystal layer 15 to form the linearly polarized light S. The linearly polarized light S is transmitted through the front-side absorption polarization plate 16 and emitted on the front side of the first liquid crystal display unit 10A.

At the electric field application time (V>Vth) when the electric field is applied between the electrodes of the liquid crystal cell 11 of the first liquid crystal display unit 10A so as to raise and align the liquid crystal molecules substantially vertically to the substrates 12, 13 planes, as shown on the right side of FIG. 11B, the linearly polarized light P incident upon the rear side of the liquid crystal cell 11 is incident upon the front-side absorption polarization plate 16 still in the polarized state without undergoing birefringence by the liquid crystal layer 15. Most of the light is absorbed by the front-side absorption polarization plate 16.

Therefore, the display at the non-electric-field time in the transmission display using the one surface (front surface of the first liquid crystal display unit 10A) as the display side is the bright display (colored display), and the display at the electric field application time (V>Vth) is the dark display (black display).

Next, the transmission path of the incident light at the time when the other surface is used as the display side will be described. As shown in FIG. 12A showing the transmission path of the incident light at the time of the reflection display using the other surface as the display side, the outside light (non-polarized light) incident upon the front side of the second liquid crystal display unit 10B is formed into the linearly polarized light P parallel to the transmission axis 16a and is incident upon the liquid crystal cell 11 by the absorption polarization plate 16 on the front side of the second liquid crystal display unit 10B.

At the non-electric-field time (V=0) when the electric field is not applied between the electrodes of the liquid crystal cell 11, as shown on the left side of FIG. 12A, the linearly polarized light P transmitted through the front-side absorption polarization plate 16 and incident upon the liquid crystal cell 11 is turned substantially by 90° to form the linearly polarized light S. The linearly polarized light S is transmitted through the rear-side absorption polarization plate 17, and emitted on the rear side of the second liquid crystal display unit 10B.

The linearly polarized light S emitted on the rear side of the second liquid crystal display unit 10B is incident upon the irradiation member 20c, and is formed into the clockwise circular polarized light R1 toward the travel direction by the λ/4 retardation plate 35 of the second polarized-light split element 33 of the irradiation member 20c. The light is incident upon the circular polarized-light split layer 34, transmitted through this circular polarized-light split layer 34, and emitted on the rear side of the second polarized-light split element 33.

The clockwise circular polarized light R1 emitted on the rear side of the second polarized-light split element 33 is transmitted through the light guide plate 25 of the plane light source 24 and reflected by the circular polarized-light split layer 34 of the first polarized-light split element 32. The reflected light R1 is again transmitted through the light guide plate 25 of the plane light source 24 and again incident upon the rear side of the second polarized-light split element 33.

The circular polarized light R1 again incident upon the rear side of the second polarized-light split element 33 is transmitted through the circular polarized-light split layer 34 of the second polarized-light split element 33. The light is returned to the same linearly polarized light P as the light emitted on the rear side of the second liquid crystal display unit 10B and incident upon the irradiation member 20c and emitted on the first liquid crystal display unit 10A side by the λ/4 retardation plate 35. The light is again transmitted through the first liquid crystal display unit 10A and emitted on the front side of the unit.

At the electric field application time (V>Vth) when the electric field is applied between the electrodes of the liquid crystal cell 11 of the second liquid crystal display unit 10B so as to raise and align the liquid crystal molecules substantially vertically to the substrates 12, 13 planes, as shown on the right side of FIG. 12A, the linearly polarized light S incident upon the front side of the second liquid crystal display unit 10B, transmitted through the front-side absorption polarization plate 16, and incident upon the liquid crystal cell 11 is incident upon the rear-side absorption polarization plate 17 still in the polarized state without undergoing birefringence by the liquid crystal layer 15. The light is absorbed by the absorption polarization plate 17.

Therefore, the display at the non-electric-field time in the reflection display using the other surface (front surface of the second liquid crystal display unit 10B) as the display side is the bright display (colored display), and the display at the electric field application time (V>Vth) is the dark display (black display).

At the time of the transmission display using the other surface as the display side, in the same manner as in the transmission display using the above-described one surface as the display side, the light emitting element 26 of the plane light source 24 of the irradiation member 20c is lit. The linearly polarized light P is emitted on the first liquid crystal display unit 10A side from the irradiation member 20c, and the linearly polarized light S is emitted on the second liquid crystal display unit 10B side.

The linearly polarized light S emitted on the second liquid crystal display unit 10B side from the irradiation member 20c is transmitted through the absorption polarization plate 17 of the rear side of the second liquid crystal display unit 10B and is incident upon the rear side of the liquid crystal cell 11. The light undergoes birefringence by the liquid crystal layer 15 in accordance with the aligned state of the liquid crystal molecules, which changes with the electric field applied between the electrodes of the liquid crystal cell 11, and is emitted on the front side of the liquid crystal cell 11.

That is, at the non-electric-field-time (V=0) when the electric field is not applied between the electrodes of the liquid crystal cell 11, as shown on the left side of FIG. 12B showing the transmission path of the incident light at the time of the transmission display using the other surface as the display side, the linearly polarized light S incident upon the rear side of the liquid crystal cell 11 is turned substantially by 90° by the liquid crystal layer 15. The linearly polarized light P parallel to the transmission axis 16a of the front-side absorption polarization plate 16 is formed, emitted on the front side of the liquid crystal cell 11, transmitted through the front-side absorption polarization plate 16, and emitted on the front side of the second liquid crystal display unit 10B.

At the electric field application time (V>Vth) when the electric field is applied between the electrodes of the liquid crystal cell 11 of the second liquid crystal display unit 10B so as to raise and align the liquid crystal molecules substantially vertically to the substrates 12, 13 planes, as shown on the right side of FIG. 12B, the linearly polarized light S incident upon the rear side of the liquid crystal cell 11 is transmitted through the liquid crystal cell 11 still in the polarized state without birefringence by the liquid crystal layer 15. The light is incident upon the front-side absorption polarization plate 16, and absorbed by the absorption polarization plate 16.

Therefore, the display at the non-electric-field time in the transmission display using the other surface (front surface of the second liquid crystal display unit 10B) as the display side is the bright display (colored display), and the display at the electric field application time (V>Vth) is the dark display (black display).

In this manner, in the display device of this embodiment, between the first and second liquid crystal display units 10A, 10B, the irradiation member 20a is disposed. The member includes one pair of polarized-light split elements 32, 33 each including: the circular polarized-light split layer 34 for reflecting one of two clockwise and counterclockwise circular polarized-light components of the incident light and transmitting the other circular polarized-light component; and the λ/3 retardation plate 35 which is disposed on the one-surface side of the circular polarized-light split layer 34 and which allows the linearly polarized light incident upon the surface opposite to the surface disposed opposite to the circular polarized-light split layer 34 as the circular polarized light to be incident upon the circular polarized-light split layer 34 and which forms the circular polarized light emitted from the circular polarized-light split layer 34 into the linearly polarized light and emits the light from the opposite surface. The respective circular polarized-light split layers 34 are disposed opposite to each other. Accordingly, at the time of the reflection display using one surface (front surface of the first liquid crystal display unit 10A) as the display side, the light is incident upon the front side of the first liquid crystal display unit 10A. The light transmitted through the first liquid crystal display unit 10A is transmitted through the polarized-light split element 32 on the first liquid crystal display unit 10A side of the irradiation member 20c, and reflected by the polarized-light split element 33 on the second liquid crystal display unit 10B side. At the time of the reflection display using the other surface (front surface of the second liquid crystal display unit 10B) as the display side, the light is incident upon the front side of the second liquid crystal display unit 10B. The light transmitted through the second liquid crystal display unit 10B is transmitted through the polarized-light split element 33 on the second liquid crystal display unit 10B side of the irradiation member 20c, and reflected by the polarized-light split element 32 on the first liquid crystal display unit 10A side.

According to the display device, each of one pair of polarized-light split elements 32, 33 of the irradiation member 20c reflects one of two different linear polarized-light components of the incident light at the high reflectance substantially without absorbing the component, and transmits the other linear polarized-light component at the high transmittance substantially without absorbing the component. Therefore, a sufficiently bright reflection display can be performed when either one of the opposite surfaces is used as the display side.

Additionally, for the display device of this embodiment, in one pair of polarized-light split elements 32, 33 of the irradiation member 20c, the circular polarized-light split layer 34 of one polarized-light split element 32 has the polarized-light split characteristic of reflecting the clockwise circular polarized-light component, and transmitting the counterclockwise circular polarized-light component. The circular polarized-light split layer 34 of the other polarized-light split element 33 has the polarized-light split characteristic of reflecting the counterclockwise circular polarized-light component and transmitting the clockwise circular polarized-light component. Therefore, at the time of the reflection display using one surface as the display side, most of the light transmitted through the first liquid crystal display unit 10A and incident upon one surface of the irradiation member 20c is reflected by the irradiation member 20c. At the time of the reflection display using the other surface as the display side, most of the light transmitted through the second liquid crystal display unit 10B and incident upon the other surface of the irradiation member 20c can be reflected by the irradiation member 20c. Therefore, either of the opposite surfaces can be used as the display side, and the display can be brighter.

Also in the display device of this embodiment, the irradiation member 20c emits a large part of the incident light on the incident side by one reflection by the polarized-light split element 33 or 32 on the side opposite to the incident side. The member also multi-reflects a part of the light between one pair of polarized-light split elements 32, 33, and emits the multi-reflected light on the incident side from the periphery of the light emitted by one reflection. Therefore, the emission area of the light from the bright display portion is enlarged, and the bright display portion is entirely brightened. Additionally, the shade of the dark display by the liquid crystal display units 10A, 10B is eliminated, and the reflection display with the satisfactory quality can be performed without any double image.

Moreover, also in the display device, the irradiation member 20c is constituted so that the plane light source 24 is disposed between one pair of polarized-light split elements 32, 33. Therefore, it is possible to perform the reflection display using the outside light in the opposite surfaces, and the transmission display using the illumination light from the plane light source 24.

In the display device of the first to fourth embodiments, both the display using one surface as the display side and the display using the other surface as the display side are in a normally white mode. However, the present invention can also be applied to the display device in a normally black mode in which the display using the one surface as the display side and/or the display using the other surface as the display side at the non-electric-field time is the dark display.

In the display device of the above-described embodiments, the first and second display units 10A, 10B are the TN type liquid crystal display units. However, the display units 10A, 10B are not limited to the TN type, and the liquid crystal display units such as an STN type, non-twisted homogeneous alignment type, homeotropic alignment type, lateral electric field type, ferroelectric or antiferroelectric type, and birefringence effect (ECB) type may also be used. Moreover, one of the first and second display units 10A, 10B may also be different in type from the other liquid crystal display unit.

Moreover, one or both of the first and second display units 10A, 10B may also be a monochromatic display unit which does not include any color filter. In this case, both the display units 10A, 10B are monochromatic display units. At the time of the transmission display, monochromatic image data of red, green, or blue is successively written in the display units 10A, 10B. A field sequential display for successively emitting a colored light of red, green, blue from the irradiation members 20, 20a, 20b, 20c may also be performed.

Furthermore, the first and second display units 10A, 10B may also be a display unit other than the liquid crystal display unit as long as the transmission and interception of the incident light are controlled.

Moreover, for the display devices of the above-described embodiments, the plane light sources 24, 24a are disposed in the irradiation members 20, 20a, 20b, 20c. Even when one surface or the other surface is used as the display side, both the reflection display using the outside light and the transmission display using the illumination lights from the plane light sources 24, 24a are performed. The plane light sources 24, 24a may be omitted from the irradiation members 20, 20a, 20b, 20c, so that only the reflection display is performed for the display, using one surface or the other surface as the display side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
    first and second display units whose front surfaces on a side to be observed are outside disposed and whose back surfaces on a side opposite to the side to be observed are inside disposed to face each other; and
    an irradiation member which includes first and second polarized-light split elements disposed between the back surfaces of the first and second display units to reflect one of two different polarized-light components of an incident light and to transmit the other polarized-light component and which reflects a light of the polarized-light component transmitted through one of the polarized-light split elements by the other polarized-light split element and which reflects a light of the polarized-light component transmitted through the other polarized-light split element by the one reflective polarized-light split element to irradiate the first and second display units with the light on back-surface sides.

2. The liquid crystal display device according to claim 1, wherein the polarized-light split elements of the irradiation member includes a linear polarized-light split element which splits the light into two linear polarized-light components crossing at right angles to each other and which transmits one linear polarized-light component and which reflects the other linear polarized-light component.

3. The liquid crystal display device according to claim 1, wherein each of the polarized-light split elements of the irradiation member comprises a reflection polarization plate including: a transmission axis having a direction parallel to a vibration plane of the light of one linear polarized-light component transmitted through the polarized-light split element in two linear polarized-light components of the incident light crossing at right angles to each other; and a reflection axis which crosses at right angles to the transmission axis and which reflects the light of the other linear polarized-light component having the vibration plane in a direction crossing at right angles to the vibration plane of the light of the one linear polarized-light component, and the respective transmission axes are disposed to cross at right angles to each other.

4. The liquid crystal display device according to claim 1, wherein each of the polarized-light split elements of the irradiation member comprises a reflection polarization plate including: a transmission axis having a direction parallel to a vibration plane of the light of one linear polarized-light component transmitted through the polarized-light split element in two linear polarized-light components of the incident light crossing at right angles to each other; and a reflection axis which crosses at right angles to the transmission axis and which reflects the light of the other linear polarized-light component having the vibration plane in a direction crossing at right angles to the vibration plane of the light of the one linear polarized-light component, and the respective transmission axes are disposed in parallel to each other, and a retardation plate is further disposed between the two reflection polarization plates.

5. The liquid crystal display device according to claim 1, wherein each of the first and second display units comprises: a liquid crystal cell comprising a front-side substrate on an observation side of display, a rear-side substrate on a backside with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having the vibration planes in directions of the incident light crossing at right angles to each other, and absorption axes crossing at right angles to the transmission axes to absorb the linear polarized-light component having the vibration plane in the corresponding direction.

6. The liquid crystal display device according to claim 5, wherein for two reflection polarization elements, the transmission axis of the first reflection polarization element on a first liquid crystal display unit side is disposed in parallel with that of the absorption polarization plate on the rear side of the first liquid crystal display unit, and the transmission axis of the second reflection polarization element on a second liquid crystal display unit side is disposed in parallel with that of the absorption polarization plate on the rear side of the second liquid crystal display unit.

7. The liquid crystal display device according to claim 1, wherein the irradiation member further comprises: a lighting device which is disposed between the two polarized-light split elements and which irradiates both the first display unit side and the second display unit side with the illumination light.

8. The liquid crystal display device according to claim 7, wherein the lighting device comprises: at least one light source; and a plate-shaped light guide plate on whose end surface the light source is disposed and which guides and emits the illumination light incident upon the end surface from the light source via the opposite surfaces of a plate-shaped member to irradiate the first and second display units and which transmits the incident lights from the first and second display units.

9. The liquid crystal display device according to claim 1, wherein the polarized-light split element of the irradiation member comprises: a circular polarized-light split element which splits the light into two circular polarized-light components rotating in directions different from each other, transmits the circular polarized-light component turning in one direction, and reflects the circular polarized-light component turning in the other direction.

10. The liquid crystal display device according to claim 1, wherein the polarized-light split element of the irradiation member comprises: a circular polarized-light split layer which reflects one of two clockwise and counterclockwise circular polarized-light components of the incident light and which transmits the other circular polarized-light component; and λ/4 retardation plates disposed on the opposite sides of the circular polarized-light split layer.

11. The liquid crystal display device according to claim 9, wherein the irradiation member further comprises: a lighting device which is disposed between two circular polarized-light split elements and which irradiates both the sides of the first and second display units with the illumination light.

12. The liquid crystal display device according to claim 9, wherein each of the first and second display units comprises: a liquid crystal cell comprising a front-side substrate on an observation side of display, a rear-side substrate on a back-side with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having the vibration planes in directions of the incident light crossing at right angles to each other, and absorption axes crossing at right angles to the transmission axes to absorb the linear polarized-light component having the vibration plane in the corresponding direction, and a delay phase axis of a λ/4 retardation plate of the polarized-light split element intersects with the absorption axis of the absorption polarization plate of the liquid crystal display unit at 45°.

13. A liquid crystal display device comprising:
first and second display units whose front surfaces on a side to be observed are outside disposed and whose back surfaces on a side opposite to the side to be observed are inside disposed opposite to each other; and
an irradiation member which comprises first and second polarized-light split elements disposed between the back surfaces of the first and second display units to reflect one of two different polarized-light components of an incident light and to transmit the other polarized-light component, and a lighting device disposed between the first and second polarized-light split elements to transmit the light transmitted through the first and second polarized-light split elements and to emit an illumination light to the first and second polarized-light split elements and which reflects a light of the polarized-light component transmitted through one of the polarized-light split elements by the other polarized-light split element and which reflects a light of the polarized-light component transmitted through the other polarized-light split element by the one reflective polarized-light split element to allow the light from the lighting device to be incident upon the first and second display units on back-surface sides.

14. The liquid crystal display device according to claim 13, wherein the polarized-light split element of the irradiation member comprises a linear polarized-light split element which splits the light into two linear polarized-light components crossing at right angles to each other and which transmits one of the linear polarized-light components and which reflects the other linear polarized-light component, and transmission axes of the first and second linear polarized-light split elements are disposed to cross at right angles to each other.

15. The liquid crystal display device according to claim 13, wherein the polarized-light split element of the irradiation member comprises a linear polarized-light split element which splits the light into two linear polarized-light components crossing at right angles to each other and which transmits one of the linear polarized-light components and which reflects the other linear polarized-light component, and transmission axes of the first and second linear polarized-light split elements are disposed in parallel with each other, and a retardation plate for adjusting a polarized state of the transmitted light is further disposed between the first and second linear polarized-light split elements.

16. The liquid crystal display device according to claim 13, wherein each of the first and second display units comprises: a liquid crystal cell comprising a front-side substrate on an observation side of display, a rear-side substrate on a backside with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having the vibration planes in directions of the incident light crossing at right angles to each other, and absorption axes crossing at right angles the transmission axes to absorb the linear polarized-light component having the vibration plane in the corresponding direction, and for two reflection polarization elements described above, the transmission axis of the first reflection polarization element on a first liquid crystal display unit side is disposed in parallel with that of the absorption polarization plate on the rear side of the first liquid crystal display unit, and the transmission axis of the second reflection polarization element on a second liquid crystal display unit side is disposed in parallel with that of the absorption polarization plate on the rear side of the second liquid crystal display unit.

17. A liquid crystal display device comprising:

first and second display means for displaying images, whose front surfaces on a side to be observed are outside disposed and whose back surfaces on a side opposite to the side to be observed are inside disposed opposite to each other; and irradiation means which comprises first and second polarized-light split means, disposed between the back surfaces of the first and second display means, for splitting an incident light into two different polarized-light components, reflecting one of the polarized-light components, and transmitting the other polarized-light component, and lighting means, disposed between the two polarized-light split means, for irradiating both the sides of the first and second display means with an illumination light and which reflects the light of the other polarized-light component transmitted through one of the polarized-light split means by the other polarized-light split means, reflects the light of the other polarized-light component transmitted through the other polarized-light split means by the one reflective polarized-light split means, and allows the light to be incident upon the first and second display means on back-surface sides from the lighting means.

18. The liquid crystal display device according to claim 17, wherein the polarized-light split means comprises means whose polarization surface splits the light into two linear polarized lights crossing at right angles to each other.

19. The liquid crystal display device according to claim 17, wherein the irradiation means comprises: first and second polarized-light split means for reflecting one of two different polarized-light components of an incident light and transmitting the other polarized-light component; and light guide means, disposed between the first and second polarized-light split means, for transmitting the light transmitted through the first and second polarized-light split means and for emitting the illumination light to the first and second polarized-light split means.

20. The liquid crystal display device according to claim 17, wherein each of the first and second display means comprises: a liquid crystal cell including a front-side substrate on an observation side of display, a rear-side substrate on a backside with respect to the front-side substrate, and a liquid crystal layer which is disposed between the front-side substrate and rear-side substrate to control a polarized state of a transmitted light in accordance with an applied electric field; and a pair of absorption polarization plates which are disposed before and after the liquid crystal cell and which include transmission axes having a direction parallel to a vibration plane of a light of a transmitted linear polarized-light component in two linear polarized-light components having the vibration planes in directions of the incident light crossing at right angles to each other, and absorption axes crossing at right angles to the transmission axes to absorb the linear polarized-light component having the vibration plane in the corresponding direction, and for two reflection polarization means, the transmission axis of the first reflection polarization means on a first liquid crystal display unit side is disposed in parallel with that of the absorption polarization plate on the rear side of the first liquid crystal display means, and the transmission axis of the second reflection polarization means on a second liquid crystal display means side is disposed in parallel with that of the absorption polarization plate on the rear side of the second liquid crystal display means.

* * * * *